United States Patent
Seo et al.

(10) Patent No.: US 6,512,731 B1
(45) Date of Patent: Jan. 28, 2003

(54) OPTICAL RECORDING/REPRODUCING APPARATUS AND METHOD FOR USING VARIOUS SIZES, AND TYPES OF RECORDING/REPRODUCING MEDIUMS THEREIN

(75) Inventors: Young-sun Seo, Sungnam (KR); Han-kook Choi, Suwon (KR); In-sik Park, Suwon (KR); Myoung-jong Song, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/471,408

(22) Filed: Dec. 23, 1999

(30) Foreign Application Priority Data

Dec. 23, 1998 (KR) ............................................. 98-57501

(51) Int. Cl.[7] ................................................. G11B 7/00
(52) U.S. Cl. ...................... 369/77.2; 369/75.2; 369/53.2
(58) Field of Search ............................... 369/77.2, 75.2, 369/179, 291, 289, 53.2, 53.37, 53.41, 76, 75.1, 77.1; 360/99.06, 133, 99.02

(56) References Cited

U.S. PATENT DOCUMENTS

| | | | | |
|---|---|---|---|---|
| 5,572,498 A | * | 11/1996 | Choi | 369/75.2 |
| 5,812,511 A | | 9/1998 | Kawamura et al. | |
| 5,923,630 A | * | 7/1999 | Yoshida et al. | 369/289 |
| 5,995,345 A | * | 11/1999 | Overbo | 360/133 |
| 6,108,299 A | * | 8/2000 | Kano et al. | 369/291 |
| 6,122,142 A | * | 9/2000 | Kabasawa | 360/99.06 |
| 6,262,960 B1 | * | 7/2001 | Watanabe | 369/77.2 |
| 6,310,855 B1 | * | 10/2001 | Choi | 369/291 |

FOREIGN PATENT DOCUMENTS

| | | |
|---|---|---|
| EP | 0 526 204 | 2/1993 |
| JP | 63 058659 | 3/1988 |
| JP | 63 058660 | 3/1988 |
| JP | 01 176365 | 7/1989 |
| JP | 02 249174 | 10/1990 |

* cited by examiner

*Primary Examiner*—Thang V. Tran
(74) *Attorney, Agent, or Firm*—Burns, Doane, Swecker & Mathis, L.L.P.

(57) ABSTRACT

An optical recording and/reproducing apparatus is capable of using a selected one of various types of recording/reproducing mediums including disc cartridges of at least two different sizes, a naked disc, and an adapter containing a disc having a diameter of 8 cm, by positioning the selected recording/reproducing mediums on one tray. The apparatus includes a tray mounted to the case and receivable into and withdrawable from the case. The tray accommodates the selected recording/reproducing medium so as to prevent movement of the recording/reproducing medium relative to the tray. A detecting section detects the size of the selected recording/reproducing medium positioned on the tray, and a state of a disc accommodated therein. A rotating section rotates the disc. An information recording/reproducing section records information onto, and/or reproduces information from, the disc rotated by the rotating section.

24 Claims, 13 Drawing Sheets

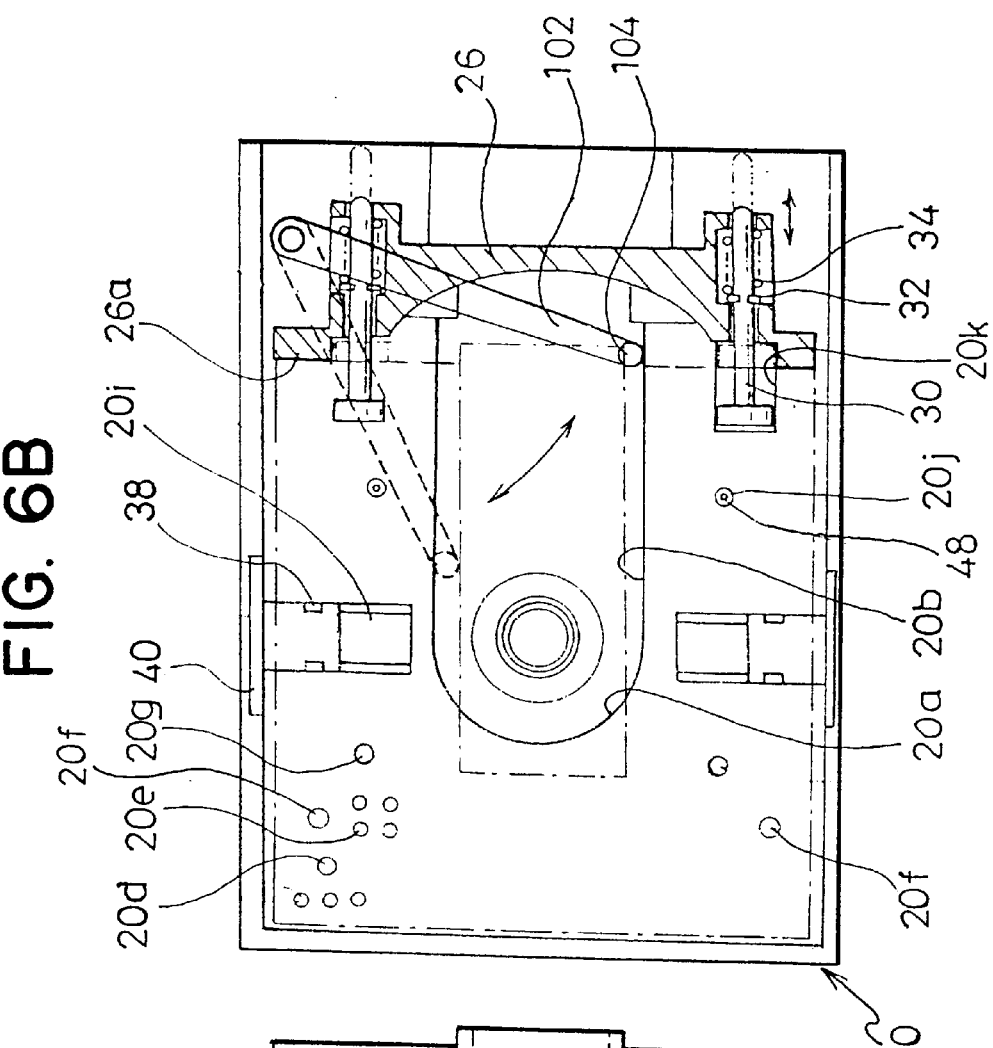
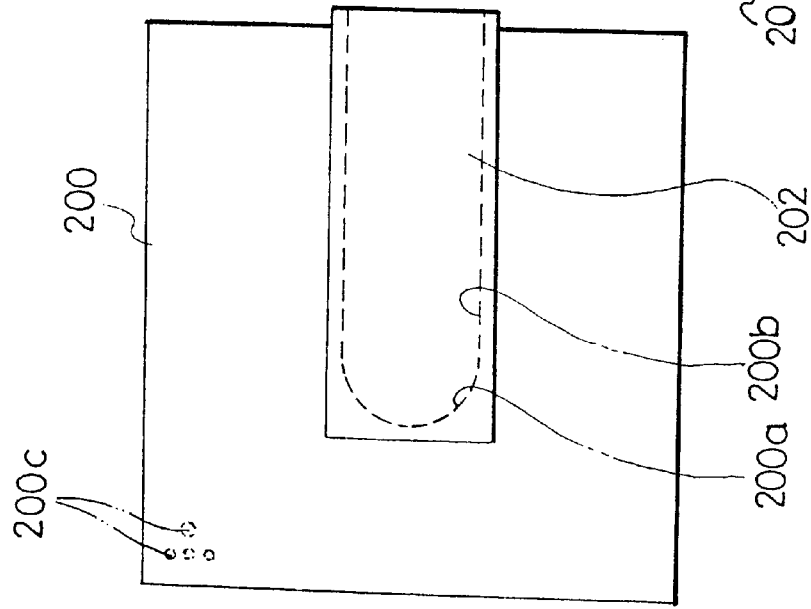

OPTICAL RECORDING/REPRODUCING APPARATUS AND METHOD FOR USING VARIOUS SIZES, AND TYPES OF RECORDING/REPRODUCING MEDIUMS THEREIN

BACKGROUND OF THE INVENTION

1. Field of the Invention

The present invention relates to an optical recording/reproducing optical apparatus and method thereof.

2. Description of the Related Art

Generally, there are various types of recording/reproducing mediums such as a disc cartridge, adapter, naked disc, or the like. Among them, disc cartridges for holding discs generally have two types, i.e., one which holds a disc having a diameter of 12 cm (hereinafter called a 12 cm disc cartridge), and another one which holds a disc having a diameter of 8 cm (hereinafter called a 8 cm disc cartridge). Such disc cartridges have an accommodating hole through which a turn table, and a chucking clamp of an optical recording/reproducing apparatus are advanced. The accommodating hole communicates with an opening which serves as a feeding passage to an optical pickup device. A shutter is mounted on each disc cartridge to open/close both the accommodating hole and the opening.

The optical recording/reproducing apparatus has a rotating section for rotating the disc at such a speed that the information can be recorded/reproduced thereon/therefrom, an optical pickup device for reading an optical signal, or recording the information, by radiating a laser beam on the rotating disc while being moved in a radial direction of the rotating disc, and a signal processing section for processing the information detected by the laser beam radiated from the optical pickup device.

Thus, when the disc cartridge is put in the optical recording/reproducing apparatus, the shutter of the disc cartridge is moved in a certain direction exposing the accommodating hole and the opening of the disc cartridge. Then, the turn table and the chucking clamp are advanced through the accommodating hole to position and chuck the disc. Continuously, the optical pickup device is linearly and reciprocally moved in a radial direction of the disc in the disc cartridge along the opening while recording/reproducing the information on/from the disc.

However, since the conventional optical recording/reproducing apparatus is capable of using only one kind of disc cartridge, there is low compatibility, i.e., both of the disc cartridges of different sizes such as 12 cm and 8 cm disc cartridges cannot be used therein.

Further, if both 12 cm and 8 cm discs are to be used, respective optical recording/reproducing apparatuses for the respective disc cartridges have to be provided, and as a result, the cost accordingly increases.

SUMMARY OF THE INVENTION

The present invention has been made to overcome the above-described problems of the prior art, and accordingly, it is an object of the present invention to provide an optical recording/reproducing apparatus capable of using disc cartridges of different sizes such as 12 cm and 8 cm disc cartridges, by selectively positioning the same on one tray.

Another object of the present invention is to provide an optical recording/reproducing apparatus capable of using a naked disc (without a disc cartridge) and an adapter containing an 8 cm disc, in addition to disc cartridges of different sizes, by selectively positioning the same on one tray.

Yet another object of the present invention is to provide a method of an optical recording/reproducing apparatus for automatically detecting the type of the recording/reproducing medium in use as being a 12 cm disc cartridge, 8 cm disc cartridge, an adapter, or a naked disc, and for automatically performing information recording and reproducing processes according to the detected recording/reproducing medium.

Additional objects and advantages of the invention will be set forth in part in the description which follows and, in part, will be apparent from the description, or may be learned by practice of the invention.

The above objects of the present invention will be accomplished by an optical recording and/or reproducing apparatus to accommodate disc cartridges as recording/reproducing mediums of at least two different sizes which receive respective discs of different sizes, including: a case; a tray mounted to the case and receivable into and withdrawable from the case, the tray selectively accommodating the disc cartridges; means for supporting the recording/reproducing mediums selectively positioned on the tray according to sizes of the recording/reproducing mediums, so as to prevent movement of the recording/reproducing mediums on the tray; means for detecting the sizes of the recording/reproducing mediums selectively positioned on the tray, and states of the respective discs accommodated in the recording/reproducing mediums; means for rotating the discs of the recording/reproducing mediums selectively positioned on the tray; means for recording information on and/or reproducing the information from the discs rotated by the rotating means; and a deck base for supporting the rotating means and the information recording/reproducing means, and being rotatably moved upwardly and downwardly in accordance with the reception/withdrawal of the tray with respect to the case.

The optical recording/reproducing apparatus according to the present invention includes: means for opening/closing shutters, which are slidably disposed on the recording/reproducing mediums to open/close the accommodating hole and the opening, in accordance with the reception/withdrawal of the tray with respect to the case; and means for pressing hubs of the discs accommodated in the recording/reproducing mediums, to chuck the discs onto the rotating means.

The supporting means includes a press member to contact with, and press a side of a first disc cartridge holding a disc having a diameter of 12 cm and a second disc cartridge holding a disc having a diameter of 8 cm of the at least two disc cartridges selectively positioned on the tray; a holding member mechanism to hold both sides of the second disc cartridge, to prevent movement of the second disc cartridge positioned on the tray; and a horizontality member mechanism to maintain a horizontality of the second disc cartridge with respect to a bottom of the tray.

The press member includes a press slider disposed on the tray, the press slider having a pair of hooks to be inserted into the pair of guide grooves of the tray, the press slider further having a pair of holes, a pair of press portions integrally formed at first and second sides of the press slider, to press the side of the first disc cartridge, a pair of press rods movably disposed within the respective holes of the press slider, and linearly movable, the press rods to press a side of the second disc cartridge positioned on the tray, and a pair of first coil springs disposed around the pair of press rods to elastically support the press rods toward initial positions, respectively.

The holding member mechanism includes a pair of holder brackets movably disposed at the coupling holes, respectively, to close-contact with opposite sides of the second disc cartridge positioned on the tray, wherein the holder brackets have guide pieces having upper ends of the guide pieces slanted to prevent interference occurring with a lower surface of the first disc cartridge.

Each of the horizontality members includes a pair of brackets fixed to both lower sides of the tray, a pair of bracket shafts movably disposed upward and downward on the brackets to selectively protrude through corresponding piercing holes so that the bracket shafts are inserted into the insert holes formed at a lower surface of the second disc cartridge, and a pair of second coil springs disposed between the bracket shafts and the brackets to elastically support the bracket shafts upward.

The detecting means includes first detecting means for detecting a size of the first disc cartridge on the tray and a state of the disc accommodated therein; and second detecting means for detecting a size of a second disc cartridge on the tray and the state of a disc accommodated therein.

The first detecting means includes a plurality of first detecting holes formed on the tray corresponding to the sensor holes of the first disc cartridge; and at least one sense switch attached to the deck base, to be inserted into the sensor holes of the first disc cartridge through the first detecting holes. Here, the sensor holes of the first disc cartridge include a cartridge detecting sensor hole, and a plurality of disc state detecting sensor holes. Further, the sensor switches include a first sensor switch disposed to correspond to the cartridge detecting sensor hole, and a plurality of second sensor switches disposed to correspond to the disc state detecting sensor holes. The recording/reproducing medium positioned on the tray is detected as the first disc cartridge when the first sensor switch is turned 'on'.

The second detecting means includes at least one leaf switch attached to the deck base, exposed through the guide grooves of the tray, the leaf switch detecting the size of the second disc cartridge positioned on the tray by selectively contacting with the contact portions of the press rods which are moved along the guide grooves, and in response, turned on/off, a plurality of second detecting holes formed on the tray corresponding to the sensor holes of the second disc cartridge, and a photo-sensor attached to the deck base, to detect the state of the disc accommodated in the second disc cartridge by projecting a laser beam through the second detecting holes to the sensor holes of the second disc cartridge, and to receive the laser beam projected through the second detecting holes to the sensor hole of the second disc cartridge, and the recording/reproducing medium positioned on the tray is detected as the second disc cartridge when the leaf switch is in 'on' state.

The photo-sensor includes a light emitting element to project the laser beam to the diffusion lens through one of the second detecting holes of the tray, a plurality of light receiving elements disposed at positions corresponding to the sensor holes of the second disc cartridge, the light receiving elements to receive the laser beams transmitted to the sensor holes of the second disc cartridge via the diffusion lens, and a circuit board to which the light emitting element and the light receiving elements are attached and supported, the circuit board to electrically detect received laser beams received by the light receiving elements.

Further, the detecting means of the optical recording and/or reproducing apparatus according to the present invention further includes third detecting means for detecting a size of the adapter positioned on the tray. The third detecting means includes a third sensor switch disposed on the deck base corresponding to the A3 sensor hole formed on the adapter, and the recording/reproducing medium positioned on the tray is detected as the adapter accommodating a disc having a diameter of 8 cm when the third sensor switch is detected as in 'off' state.

Further, in the optical recording and/or reproducing apparatus according to the present invention, a naked disc (without disc cartridge) as the recording/reproducing medium is also used. Here, the recording and/or reproducing apparatus detects that the naked disc is positioned on the tray when the first sensor switch, the leaf switch, and the third sensor switch are in 'off' state.

An optical recording and/or reproducing apparatus to accommodate a recording/reproducing medium, the recording/reproducing medium including disc cartridges of at least two different sizes which receive respective discs of different sizes, an adapter which accommodates a disc having a diameter of 8 cm, and a naked disc, the optical recording and/or reproducing apparatus, according to the present invention includes: a case; a tray mounted to the case and receivable into and withdrawable from the case, the tray selectively accommodating first and second disc cartridges of the disc cartridges, the adapter, and the naked disc; supporting means for supporting the recording/reproducing mediums selectively positioned on the tray according to sizes of the recording/reproducing mediums, so as to prevent movement of the recording/reproducing mediums on the tray; first positioning means for determining a first position of the first disc cartridge on the tray; first detecting means for detecting a size of the first disc cartridge positioned on the tray by the first positioning means, and a state of a disc accommodated in the first disc cartridge; second positioning means for determining a second position of the second disc cartridge on the tray, second detecting means for detecting a size of the second disc cartridge positioned on the tray by the second positioning means, and a state of the disc accommodated in the second disc cartridge; third detecting means for detecting the adapter positioned on the tray, and the state of the disc accommodated in the adapter; disc rotating means for rotating the discs of the recording/reproducing mediums which are selectively positioned on the tray; information recording/reproducing means for recording information on and/or reproducing the information from the discs rotated by the rotating means; and a deck base for supporting the disc rotating means and the information recording/reproducing means, and being rotatably moved upwardly and downwardly in accordance with the reception/withdrawal of the tray with respect to the case.

The first positioning means includes: a pair of first positioning pin holes formed on the tray corresponding to the insert apertures of the first disc cartridge; and a pair of first positioning pins disposed on the deck base to be inserted into the insert apertures of the first disc cartridge after being passed through the first positioning pin holes.

The second positioning means includes: a pair of second positioning pin holes formed on the tray corresponding to the insert apertures of the second disc cartridge; a rotational bracket movably disposed on the case by a hinge pin to be moved upwardly and downwardly, and having a pair of second positioning pins to be inserted into the insert apertures of the second disc cartridge after being passed through the second positioning pin holes; and rotational bracket operating means operated by the second detecting means to rotate the rotational bracket upwardly and downwardly.

The rotational bracket operating means includes: a slider to be reciprocally and linearly moved along a pair of guide protrusions of the case, and having a pair of slanted slots formed on both sides through which the insert protrusions of the rotational brackets are inserted, coupling holes formed on a rear end of the slider, which has rack gears formed at inner circumference of the coupling holes; a motor which is a driving source for reciprocally and linearly moving the slider by being turned 'on/off' by the second detecting means; and a power transmitter for transmitting the driving force of the driving motor to the slider.

Meanwhile, a method of recording and/or reproducing information using an optical recording and/or reproducing apparatus according to the present invention includes the steps of: a) detecting whether the recording/reproducing mediums are positioned on the tray of the optical recording and/reproducing apparatus; b) detecting whether the recording/reproducing medium positioned on the tray is a first disc cartridge, a second smaller disc cartridge, an adapter, or a naked disc; c) detecting a state of a disc accommodated in the recording/reproducing medium; and d) recording and/or reproducing an information on the disc in accordance with the results detected in step c).

Here, the step b) detects the recording/reproducing medium positioned on the tray as being the first disc cartridge when a first sensor switch of the optical recording and/or reproducing apparatus is in 'on' state, as being the second disc cartridge when a leaf switch is in 'on' state, as being the adapter when a third sensor switch is in 'off' state, and as being the naked disc when the first sensor switch, the leaf switch, and a third sensor switch are in 'off' state.

Further, the step c) includes the sub-steps of: c1) detecting whether the disc is single-sided or double-sided; c2) detecting whether the disc is formatted or unformatted; c3) detecting whether to verify a recordable side of the disc or not; and c4) detecting whether to record or reproduce the information on/from the disc.

Further, a method of recording and/or reproducing information using an optical recording and/or reproducing apparatus according to the present invention further includes the step of displaying information about the type, size, and recordable side of the disc, and whether the disc is formatted or not, to a user.

According to the present invention, since the disc cartridges accommodating discs of different sizes, the adapter holding the 8 cm disc, and the naked disc can be used on only one tray, the compatibility of the product is improved, and the user has more convenience when using the product. Also, the cost decreases.

Further, according to the present invention, since the information recording and/or reproducing processes are automatically performed in accordance with the state of the disc accommodated in the recording/reproducing medium on the tray, which are also automatically detected, information recording and/or reproducing time can be greatly reduced.

BRIEF DESCRIPTION OF THE DRAWINGS

The above and other objects and advantages will be more apparent by describing preferred embodiments in greater detail with reference to the accompanying drawings of which:

FIG. 6A is a plan view showing a 12 cm disc cartridge;

FIG. 6B is a plan view of a tray of the optical recording/reproducing apparatus according to the preferred embodiment of the present invention, with a 12 cm disc shown in phantom lines on the tray;

DESCRIPTION OF THE PREFERRED EMBODIMENT

Figure 1:
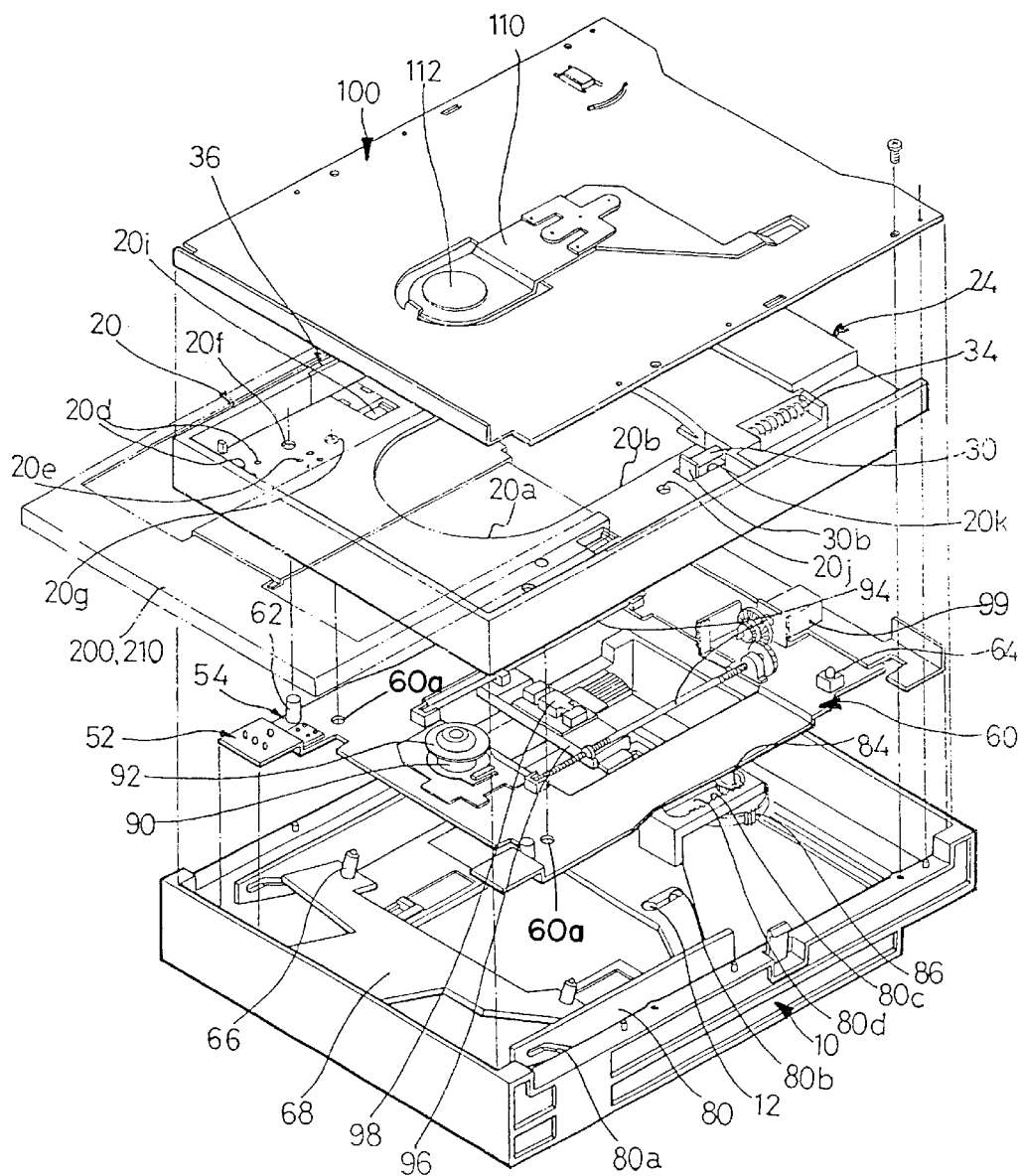
FIG. 1 is an exploded perspective view showing an optical recording/reproducing apparatus according to a preferred embodiment of the present invention.

Reference will now made in detail to the preferred embodiments of the present invention, examples of which are illustrated in the accompanying drawings, wherein like reference numerals refer to the like elements throughout. The embodiments are described below in order to explain the present invention by referring to the figures.

Figure 2:
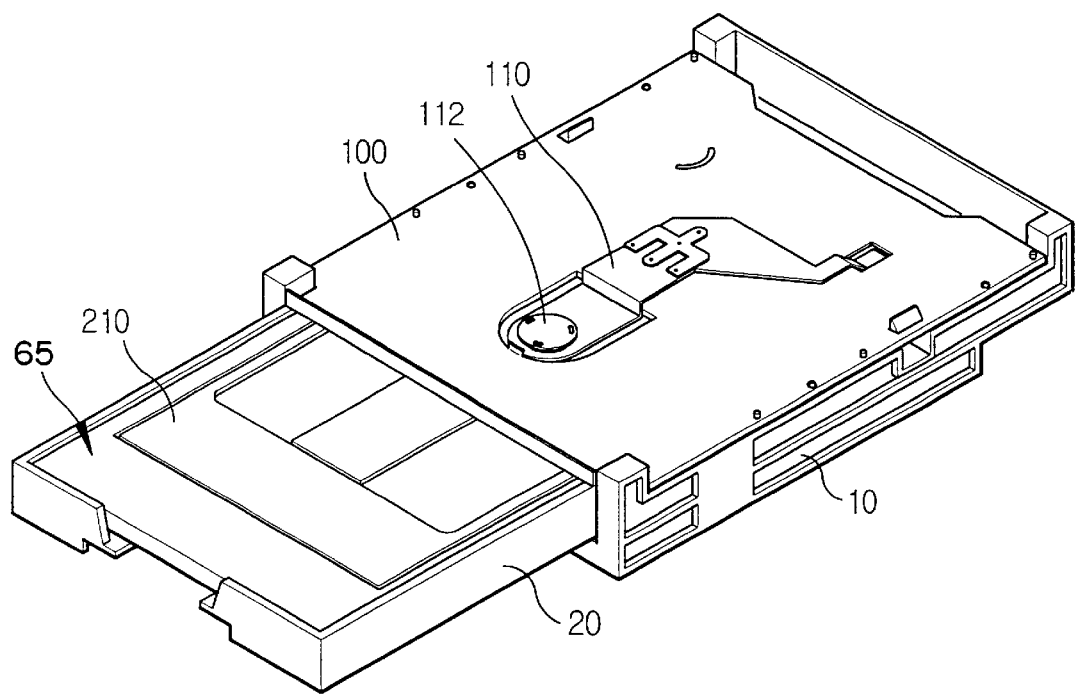
FIG. 2 is a perspective view showing a case, a tray, and an adapter of an optical recording/reproducing apparatus according to the present invention.
Figure 3:
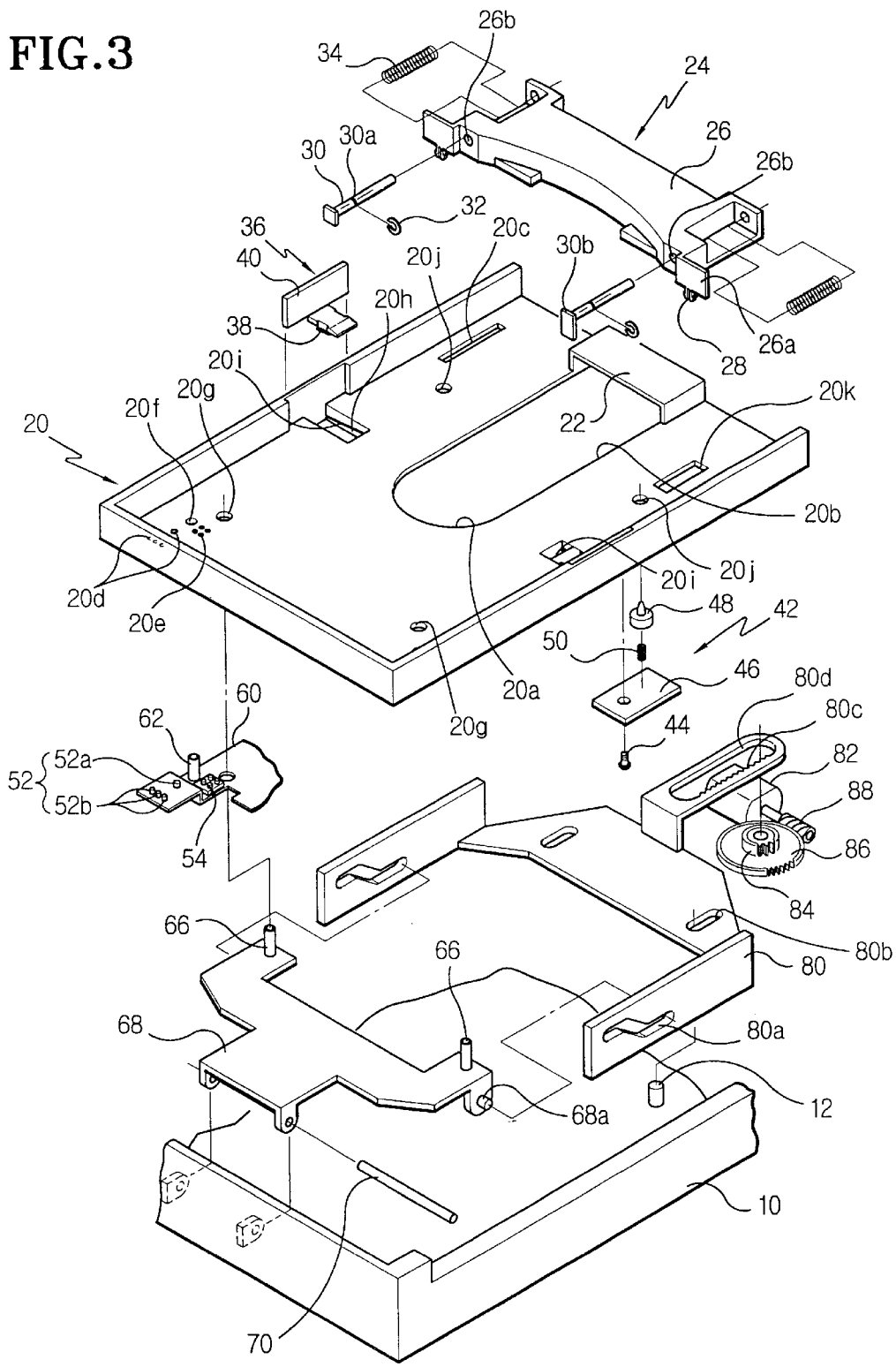
FIG. 3 is an exploded perspective view showing a main portion of the optical recording/reproducing apparatus according to the preferred embodiment of the present invention.

FIGS. 1 to 3 show an optical recording/reproducing apparatus according to the preferred embodiment of the present invention. In these figures, a reference numeral 10 is a case, and 20 is a tray. The tray 20 is mounted to the case 10 and is capable of being received/withdrawn into/from the case 10. The tray 20 selectively receives disc cartridges of different sizes for holding discs of different sizes, such as a cartridge 200 which holds a disc d having a diameter of 12 cm (hereinafter called a 12 cm disc cartridge), and another cartridge 210 which holds a disc d' having a diameter of 8 cm (hereinafter called an 8 cm disc cartridge), for example. The tray 20 has a support section for supporting the disc cartridges 200 and 210 in accordance with the sizes of the disc cartridges 200 and 210 thereby preventing the possible movement of the disc cartridges 200 and 210 while being positioned on the tray 20.

Further, the optical recording/reproducing apparatus according to the present invention includes a detecting section for detecting the sizes of the disc cartridges 200 and 210 on the tray 20, and the state of discs d and d' accommodated in the disc cartridges 200 and 210, respectively, a rotating section for rotating the discs d and d' (see FIGS. 7, 8, 10, 12, and 13) accommodated in the disc cartridges 200 and 210 positioned on the tray 20, and a recording/reproducing section for recording/reproducing information on/from the discs d and d' rotated by the rotating section.

Figure 9:
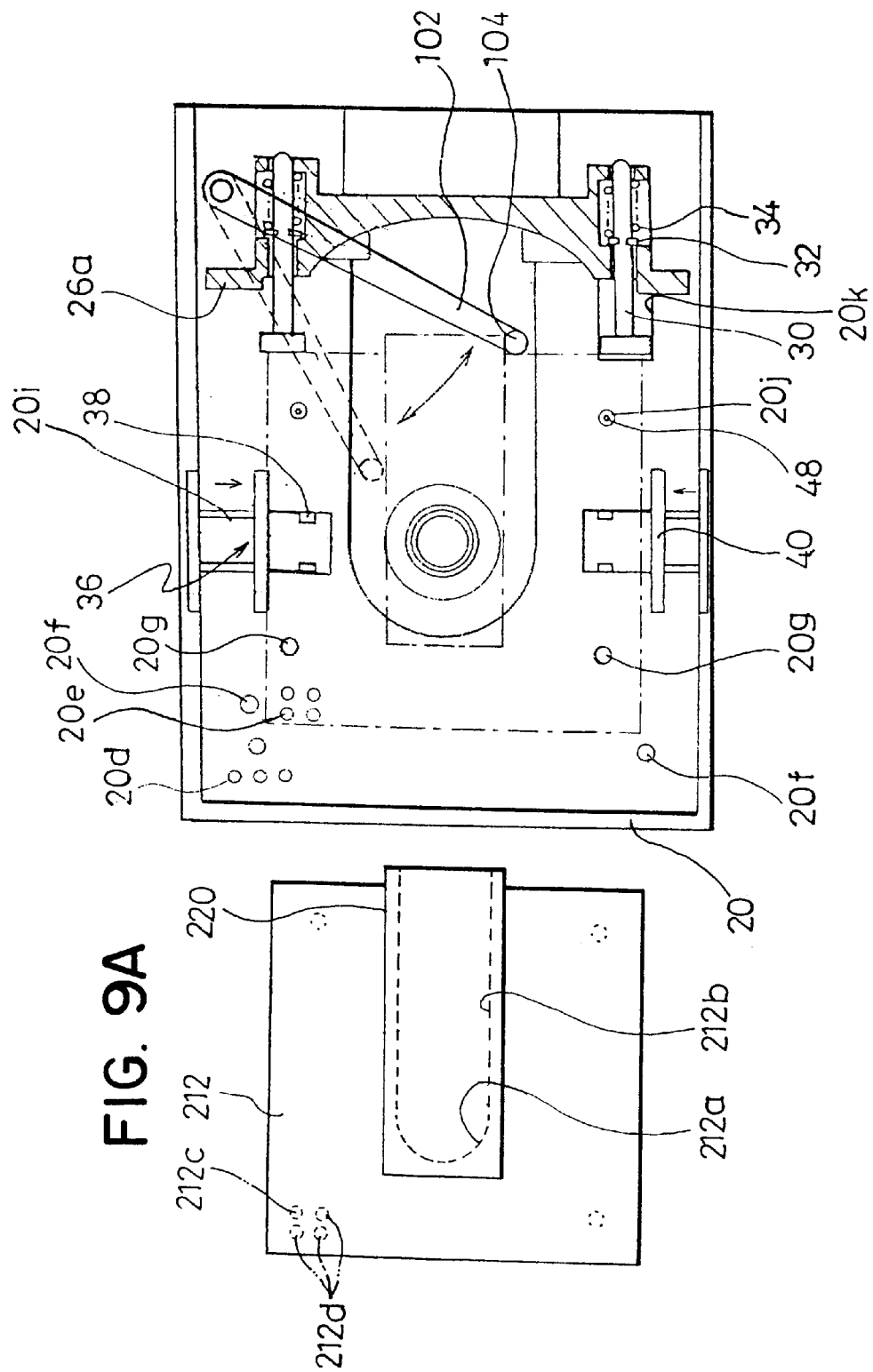
FIG. 9A is a plan view showing an 8 cm disc cartridge.
FIG. 9B is a plan view of the tray showing the 8 cm disc positioned on the tray of the optical recording/reproducing apparatus according to the preferred embodiment of the present invention.
Figure 10:
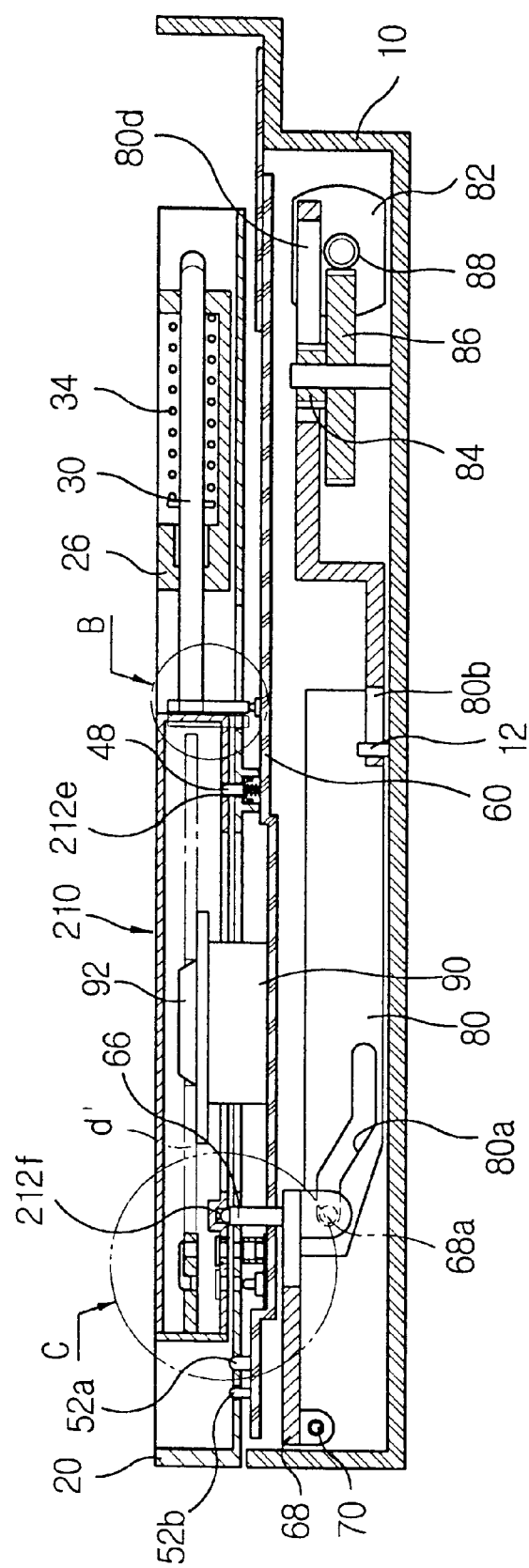
FIG. 10 is a sectional side view of the optical recording/reproducing apparatus shown in FIG. 9.

The optical recording/reproducing apparatus according to the present invention further includes a shutter opening/closing section for opening/closing shutters 202 and 220 (see FIGS. 4, 6, and 9) respectively mounted on the disc cartridges 200 and 210 in accordance with the receiving/withdrawing of the tray into/from the case 10, and a disc chucking section for chucking the discs d and d' onto the rotating section by pressing hubs of the discs d and d' accommodated in the respective disc cartridges 200 and 210.

Hereinafter, the construction of the optical recording/reproducing apparatus according to the present invention will be described in greater detail with reference to FIGS. 4 to 13.

Figure 4:
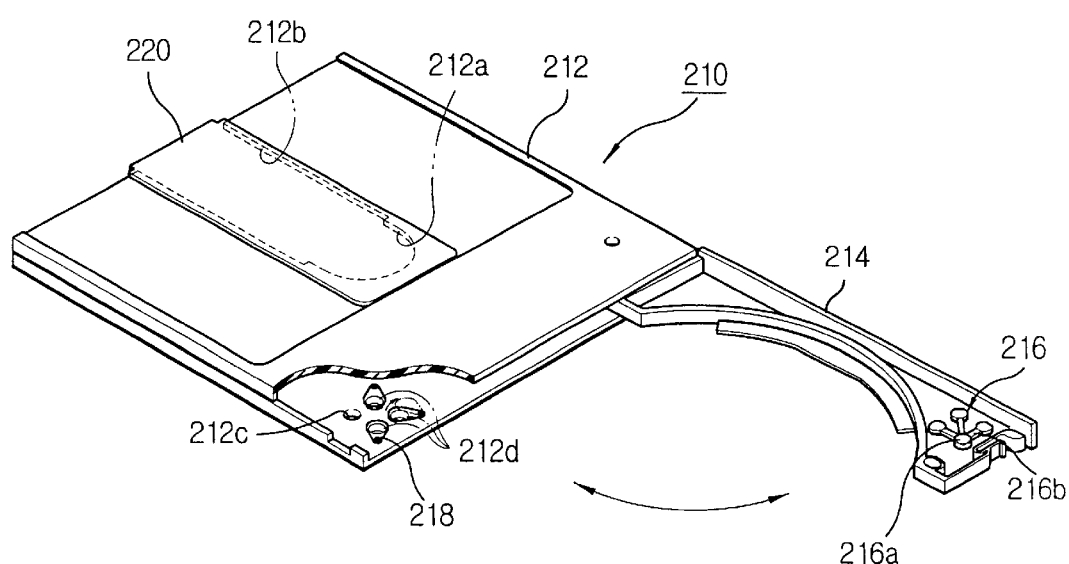
FIG. 4 is a perspective view showing an 8 cm disc cartridge used in the optical recording/reproducing apparatus according to the preferred embodiment of the present invention.
Figure 5:
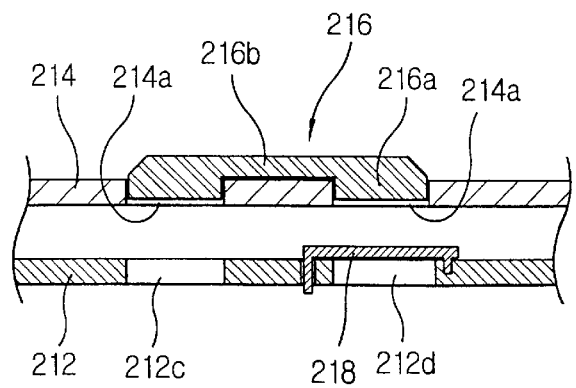
FIG. 5 is an enlarged sectional view showing a main portion of the 8 cm disc cartridge in FIG. 4.

FIG. 4 is a perspective view showing the 8 cm disc cartridge 210 used in an optical recording/reproducing apparatus, and FIG. 5 is an enlarged sectional view through the 8 cm disc cartridge 210 shown in FIG. 4, with a cover 214 in a closed state.

As shown in FIG. 4, the 8 cm disc cartridge 210 has a cartridge case 212 having accommodating holes 212a and openings 212b formed on upper and lower sides thereof, and an opening cover 214 hinged on the cartridge case 212 to prevent a separation of the disc d' (not shown in the drawing) from the 8 cm disc cartridge 210.

A piercing hole 212c and a plurality of second sensor holes 212d are formed at a corner area of the cartridge case 212. The second sensor holes 212d include a hole for detecting whether the disc d' has been drawn out from the 8 cm cartridge case 212 for replacement, a hole for detecting whether the disc d' is single or double-sided, and a hole for detecting whether the disc d' is formatted or unformatted, for example.

Additionally, the opening cover 214 has fitting holes 214a corresponding respectively to the piercing hole 212c and the second sensor holes 212d. A diffusion lens 216 of a transparent material is disposed at the fitting holes 214a of the opening cover 214. The diffusion lens 216 has insert portions 216a respectively inserted into the fitting holes 214a, and connectors 216b for interconnecting the insert portions 216a.

A light receiving plate 218 is disposed at each of second sensor holes 212d of the cartridge case 212, to selectively open/close the second sensor holes 212d as a user wishes. The light receiving plate 218 is manually operated by the user.

The 12 cm disc cartridge 200 has an accommodating hole 200a with an opening 200b formed extending through upper and lower sides of the 12 cm disc cartridge 200 (see FIG. 6A) and will be described in greater detail later on.

Meanwhile, referring to FIGS. 1 to 3, and 6B, the tray 20 has a center hole 20a and a feeding hole 20b formed on a bottom thereof, corresponding to the accommodating holes 200a and 212a and the openings 200b and 212b of the disc cartridges 200 and 210. Due to the presence of the center hole 20a and the feeding hole 20b, the disc d or d' is exposed to the recording/reproducing section when the shutters 202 and 220 of the respective disc cartridges 200 and 210 are opened by the shutter opening/closing section. It is preferable that the accommodating hole 212a and the opening 212b of the 8 cm disc cartridge 210 have the same diameter and width as the accommodating hole 200a and the opening 200b of the 12 cm disc cartridge 200.

Further, a guide part 22 of a certain height bridges an end of the feeding hole 20b of the tray 20. The guide part 22 is disposed between a pair of guide apertures 20c and 20k which are formed on the tray 20.

A plurality of first and second detecting holes 20d and 20e are formed at a corner area of the tray 20, and pairs of first and second positioning pin holes 20f and 20g are formed on both corner areas of the tray 20. Between the first and the second positioning pin holes 20f and 20g and the guide apertures 20c and 20k, a pair of rectangular coupling holes 20i having guide rails 20h are formed. Adjacent to the coupling holes 20i, a pair of penetrating holes 20j are formed.

The guide part 22 is provided with a press member 24 which presses against an edge of the disc cartridges 200 and 210 positioned on the tray 20 by surface-contact therewith. A pair of holding units 36 are disposed in respective ones of the coupling holes 20i to hold the 8 cm disc cartridge 210 from both sides thereof so as to prevent movement of the 8 cm disc cartridge 210 while the same is positioned on the tray 20. Additionally, a pair of horizontal-hold members 42, respectively disposed in the penetrating holes 20j, maintain the 8 cm disc cartridge 210 horizontal and parallel with respect to the bottom of the tray 20 when the 8 cm disc cartridge 210 is positioned on the tray 20.

The press member 24 has a press slider 26, and press portions 26a formed on respective sides of the press slider 26 to press against an edge of the 12 cm disc cartridge 200. Hooks 28 are formed on the respective lower sides of the press portions 26a to be inserted into the guide apertures 20c and 20k of the tray 20. A pair of press rods 30 are movably disposed in respective holes 26b formed on both sides of the press slider 26 to press against an edge of the 8 cm disc cartridge 210 when the same is positioned on the tray 20. Each of the press rods 30 has a contact portion 30b formed on the leading end thereof, and a groove 30a formed around the circumference of the rod. An E-ring 32 is disposed in the groove 30a. Thus, the press rods 30 are never completely separated from the holes 26b of the press sliders 26. Additionally, first coil springs 34 are disposed around the press rods 30 to bias the press rods 30 to an initial position. Here, the respective contact portions 30b of the press rods 30 are moved along the guide apertures 20c and 20k so that the disc cartridges 200 and 210 are properly supported by, and positioned on the tray 20.

The holding members 36 respectively include holder brackets 40 movably disposed at the coupling holes 20i which are formed at the middle of the sides of the tray 20. The holder brackets 40 are moved in a perpendicular direction with respect to the direction in which the disc cartridges 200 and 210 are advanced. The holder brackets 40 respectively have guide pieces 38 formed with guide grooves into which the guide rails 20h of the coupling holes 20i are inserted. A leading end of each of the guide pieces 38 is slanted to prevent a possible interference that would occur with a lower surface of the 12 cm disc cartridge 200 when the 12 cm disc cartridge 200 is positioned on the tray 20.

Further, each horizontal-hold member 42 has a bracket 46 fixed to a lower surface of the tray 20 by a screw 44, a bracket shaft 48 movably disposed on the bracket 46, capable of being moved upward and downward, and a second coil spring 50 elastically biasing respective bracket shafts 48 upwardly. Leading ends of the bracket shafts 48 pass through the piercing holes 20*j* of the tray 20, and protrude upwardly therefrom to be inserted into position holes 212*e* (see FIG. 10) formed at the lower surface of the 8 cm disc cartridge 210. Thus, the 8 cm disc cartridge 210 is maintained horizontal when positioned on the tray 20.

Meanwhile, the detecting section has a first detecting part for detecting the size of the 12 cm disc cartridge 200 and the state of the disc d accommodated therein, and a second detecting part for detecting the size of the 8 cm disc cartridge 210 and the state of the disc d' accommodated therein.

The first detecting part has a sensor switch arrangement 52 that passes through the first detecting holes 20*d* formed in the tray 20 and then enters first sensor holes 200*c* (see FIG. 6A) of the 12 cm disc cartridge 200. Here, the first sensor holes 200*c* may include a cartridge sensor hole, and a plurality of disc state sensor holes, for example. In this case, the cartridge sensor hole is in the closed state. The disc state sensor holes are open/closed in accordance with the state of the disc.

The sensor switch arrangement 52 is attached to a deck base 60. The deck base is movable upwardly and downwardly in response to the tray 20 being inserted or withdrawn, respectively, from the case 10. The deck base can be mounted and moved in any suitable manner. For instance, the deck base can be hinged along one of its edges (e.g. the right-hand edge in FIG. 7) and can have one or more holes with a female screw thread that receives a motor-driven post having a male screw thread. When the post(s) is rotated by the motor, the desk base is swung upwardly or downwardly about its hinge.

The sensor switch arrangement 52 includes a first sensor switch 52*a* for sensing the types of the cartridges, and a plurality of second sensor switches 52*b* for sensing the state of the disc. In an initial state when the cartridge is not yet mounted to the tray 20, the sensor switches are in an "off" state. Then, when the cartridge 200 is positioned on the tray 20 and advanced into the case 10, the deck base 60 is raised and accordingly, the sensor switches are respectively inserted into the first sensor holes 200*c* through a plurality of the first sensor holes 20*d* formed in the tray 20. In such a situation, since the cartridge sensor hole of the 12 cm disc cartridge 200 is in the closed state, the first sensor switch 52*a* is pressed by the 12 cm disc cartridge so that the first sensor switch is turned to the "on" state. Consequently, it is detected that the recording/reproducing medium positioned on the tray 20 is the 12 cm disc cartridge 200. The first sensor switch 52*a* will not be pressed if an 8 cm cartridge is installed (compare FIGS. 7 and 13).

The second detecting part has at least one leaf switch 64 attached to the deck base 60 (see FIGS. 1, 11) to be exposed through the guide aperture 20*c* or 20*k* of the tray 20, for sensing the size of the disc cartridges 200 and 210, and a photo-sensor 54 for sensing the state of the disc d' accommodated in the 8 cm disc cartridge 210. Here, the leaf switch 64 is selectively turned on/off to detect the size of the 8 cm disc cartridge 210 by being turned on/off in accordance with selective contact with the contact portions 30*b* of the press rods 30 which are moved along the guide apertures 20*c* and 20*k* that contain the leaf switch(es) 64. For example, it is determined that the cartridge is the 8 cm disc cartridge 210 if the leaf switch 64 is in "on" state. Compare the relationship of the contact portion 30*b* and the switch 64 in FIG. 7 (when a 12 cm cartridge is installed), with the same relationship in FIG. 10 when an 8 cm cartridge is installed.

Figure 12:
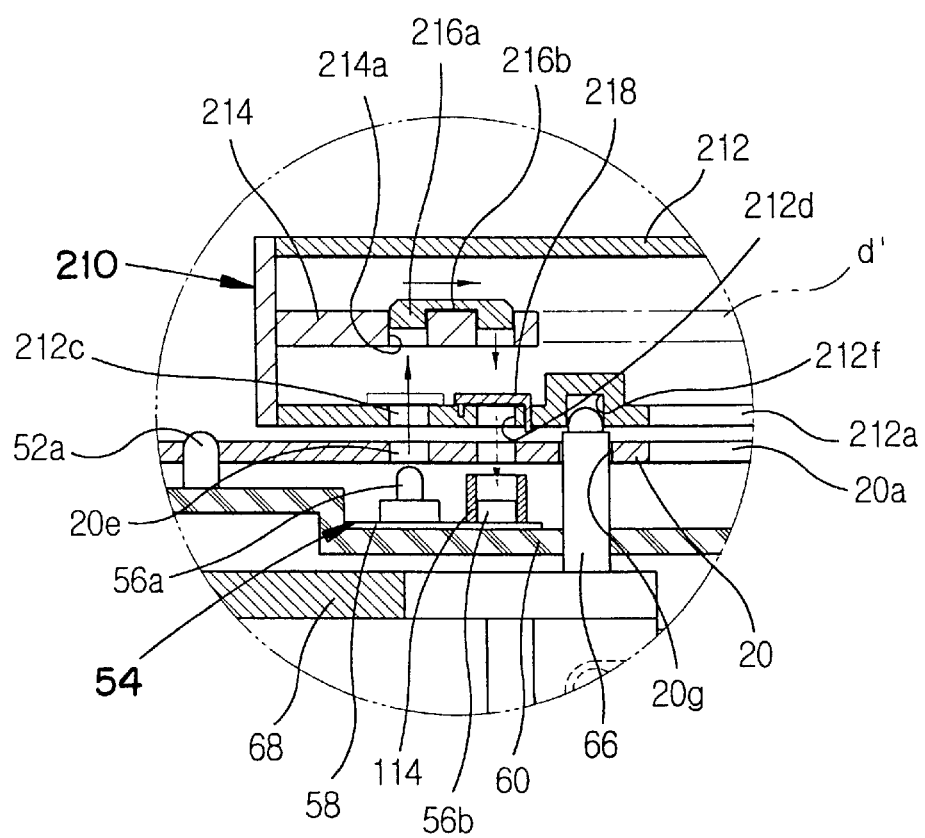
FIG. 12 is an enlarged view of an area C shown in FIG. 10.

As shown in FIG. 12, the photo-sensor 54 has (i) a light emitting element 56*a* for projecting a laser beam toward the diffusion lens 216 through the second detecting holes 20*e* and the piercing hole 212*c* of the 8 cm disc cartridge case 212, (ii) light receiving elements 56*b* positioned to correspond to the second sensor holes 212*d* of the 8 cm disc cartridge 210, to receive the laser beam transmitted to the second sensor holes 212*d* along the diffusion lens 216, and (iii) a circuit board 58 (see also FIG. 8) on which the light emitting element 56*a* and the light receiving elements 56*b* are installed, and for electrically detecting the laser beam received by the light receiving elements 56*b*. Here, the diffusion lens 216 is fitted in the fitting holes 214*a* of the opening cover 214.

Holders 114 are integrally formed on the circuit board 58 at a certain height so as to surround the respective light receiving elements 56*b*. Due to the presence of the holders 114, the laser beam transmitted to the light receiving element 56*b* via the diffusion lens 216 is not diffused to the other neighboring light receiving elements 56*b*, so that the malfunction of the light receiving elements 56*b* is prevented.

As described, according to the optical recording/reproducing apparatus of the present invention, the recording/reproducing medium positioned on the tray 20 is detected as being the 12 cm disc cartridge 200 when the first sensor switch 52*a* is in "on" state, or as being the 8 cm disc cartridge 210 when the leaf switch 64 is turned "on". Further, the state of the disc received in the 12 cm or 8 cm disc cartridge 200 or 210 is detected through a plurality of the second sensor switches 52*b* and the photo-sensor 54.

According to the optical recording/reproducing apparatus of the present invention, not only the 12 cm and 8 cm disc cartridges 200 and 210, but also a naked disc (without a disc cartridge case) can be positioned on the tray 20 to be used. The naked disc is detected when both the first sensor switch 52*a* and the leaf switch 64 are in "off" state. Since there is no cartridge case associated with the naked disc, the first sensor switch 52*a* and the leaf switch 64 are not pressed when the naked disc is positioned in the case 10. Accordingly, the first sensor switch 52*a* and the leaf switch 64 are in "off" state.

Further, as shown in FIG. 2, an adapter 65 accommodating the 8 cm disc and for permitting the use of an 8 cm disc in the optical recording/reproducing apparatus for a 12 cm disc, can be mounted on the tray 20 to be used, and in this case again, the adapter is automatically detected. A third sensor switch (not shown) for detecting the adapter is additionally provided. The third sensor switch is placed to correspond to an A3 sensor hole formed in the adapter. The A3 sensor hole is in an open state. Accordingly, when the adapter is used, the third sensor switch is received in the A3 sensor hole of the adapter. In the present invention, we set the state that the third sensor switch is inserted into the A3 sensor hole as an "off" state, and when the third sensor switch is turned to the "off" state, it is determined that the adapter is positioned on the tray and inserted into the case.

As described, according to the present invention, the 12 cm disc cartridge 200, the 8 cm disc cartridge 210, the naked disc, or the adapter is automatically detected through a plurality of sensor switches corresponding thereto which are switched "on/off".

Meanwhile, a pair of first positioning pins 62 disposed on the deck base 60 pass through the respective first positioning pin holes 20*f*, to determine the position of the 12 cm disc cartridge 200 on the tray 20. The first positioning pins 62 are inserted into insert holes 200*d* (see FIGS. 7 and 8) which are formed in the 12 cm disc cartridge 200, to position the 12 cm disc cartridge 200.

Additionally, a rotational bracket 68 is mounted on the case 10 by a hinge pin 70. The rotational bracket 68 has a pair of second positioning pins 66 which determine the position of the 8 cm disc cartridge 210 on the tray 20. The second positioning pins 66 are inserted into insert holes 212f (see FIGS. 10 and 12) which are formed in the 8 cm disc cartridge 210, to position the 8 cm disc cartridge 210.

The rotational bracket 68 is rotated upward/downward by the rotational driving means which is driven by the photosensor 54 that detects the disc d' of the 8 cm disc cartridge 210.

The rotational bracket driving means has a slider 80, a driving motor 82, and a power transmitter for transmitting the driving power of the driving motor 82 to the slider 80.

The slider 80 has a pair of slanted slots 80a formed at both leading ends of the slider 80, into which insert protrusions 68a protruding from both sides of the rotational bracket 68 are inserted. A pair of guide holes 80b are formed on a middle portion of the slider 80 into which guide protrusions 12 protruding from the case 10 are inserted. A coupling slot 80d is formed at a rear portion of the slider 80 and has a rack gear 80c formed at its inner circumferential surface.

The power transmitter has a gear 84 inserted into the coupling slot 80d to be engaged with the rack gear 80c, a worm gear 86 integrally formed with the gear 84, and a worm 88 press-fitted to a shaft of the driving motor 82 to be engaged with the worm gear 86.

Meanwhile, referring to FIG. 1, the rotating section has a spindle motor 90 fixed to the deck base 60, and a turn table 92 press-fitted to a shaft of the spindle motor 90. The discs d and d' accommodated in the disc cartridges 200 and 210 are selectively loaded on the turn table 92.

Further, the recording/reproducing section has the pickup base 96 (FIG. 1) linearly and reciprocally moved along a pair of guide rods 94 provided on the deck base 60 in parallel relation with each other, an optical head 98 disposed on an upper portion of the pickup base 96 for recording/reproducing the information on/from the discs d and d' by projecting a laser beam onto the recording surface thereof, and a motor 99 which is the driving source of the pickup base 96.

Also, as shown in FIGS. 6B and 9B, the shutter opening/closing section has a link 102 pivotally disposed at a lower surface of an upper cover 100, an opener protrusion 104 protruding from an end of the link 102 to open the shutters 202 and 220 mounted on the recording/reproducing medium, and a torsion spring (not shown) disposed at the other end of the link 102 to return the link 102 to an initial position.

As shown in FIGS. 1 and 2, the chucking means has a lever 110 disposed on the upper surface of the upper cover 100 to be pivotally moved in accordance with the insertion/withdrawal of the tray 20, and a clamper 112 mounted on one end of the lever 110 to tightly press the disc onto the turn table 92.

Hereinbelow, an operation of an optical recording/reproducing optical apparatus constructed as described above according to the present invention will be described in greater detail with respect to FIGS. 6 to 13, and the flow charts of FIGS. 14A and 14B.

When an ejecting button (not shown) provided at a front side of the case 10 is pushed, a loading motor (not shown) installed inside the case 10 is driven, and the tray 20 is ejected outward from the case 10. In such a situation, one of the 12 cm and 8 cm disc cartridges 200 and 210, a naked disc, and the adapter is selectively positioned on the tray 20.

Figure 7:
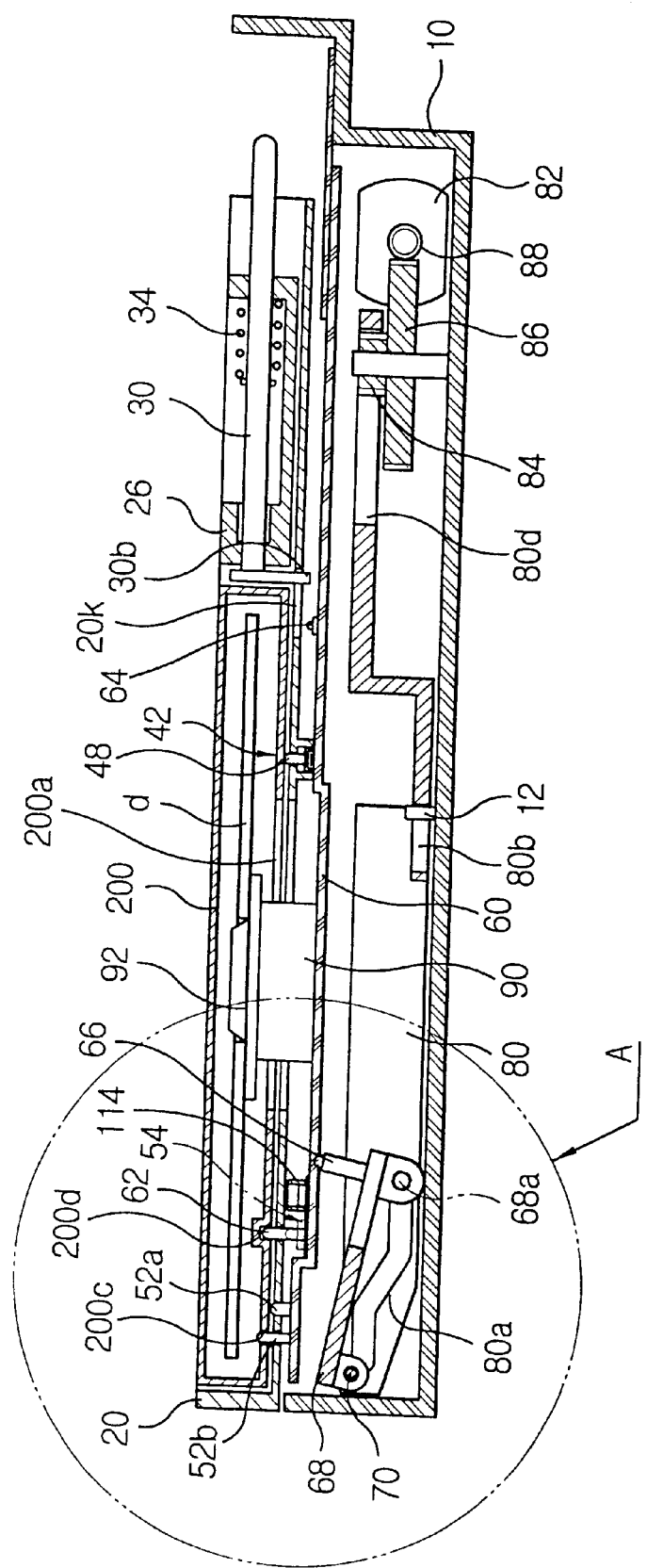
FIG. 7 is a sectional side view of the optical recording/reproducing apparatus shown in FIG. 6.
Figure 8:
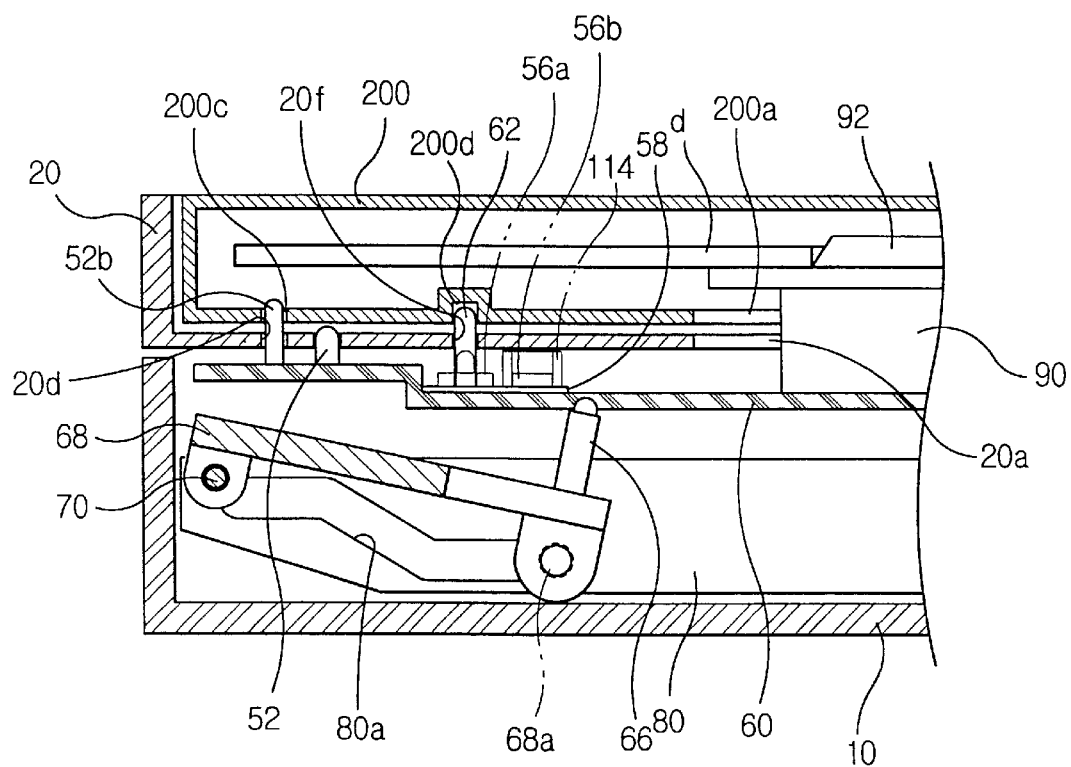
FIG. 8 is an enlarged view of an area A shown in FIG. 7.

FIGS. 6 to 8 show the 12 cm disc cartridge 200 positioned on the tray 20. As shown in the figures, when the 12 cm disc cartridge 200 is positioned on the tray 20, a lower surface of the 12 cm disc cartridge 200 is in close contact with the bottom of the tray 20. Also, the 12 cm disc cartridge 200 is supported by the press portions 26a of the press slider 26 disposed behind the 12 cm disc cartridge 200. Thus, movement of the 12 cm disc cartridge 200 is prevented.

In such a situation, as the 12 cm disc cartridge 200 is positioned on the tray 20, the contact portions 30b of the press rods 30 are pushed backward along the guide apertures 20c and 20k. Further, the bracket shafts 48 whose ends have been protruded from the piercing holes 20j of the tray 20, are now moved downward by the contact with the lower surface of the 12 cm disc cartridge 200.

Then, as the eject button is pushed again, the loading motor is reversely driven, so that the tray 20 on which the 12 cm disc cartridge 200 is positioned is advanced into the case 10 (Step S101). At this time, the shutter 202 mounted on the 12 cm disc cartridge 200 contacts with the opening protrusion 104 of the link 102 which is disposed on the upper cover 100. Accordingly, the shutter 202 is moved in a certain direction, and the accommodating hole 200a and the opening 200b are opened.

When the tray 20 is completely advanced into the case 10, as shown in FIG. 7 and FIG. 8, the deck base 60 is elevated. Accordingly, the turn table 92 is advanced into the accommodating hole 200a of the 12 cm disc cartridge 200, and the disc d is loaded thereon. Further, the first positioning pins 62 pass through the first positioning pin holes 20f of the tray 20, and then are inserted into the insert holes 200d of the 12 cm disc cartridge 200. By doing so, the position of the 12 cm disc cartridge is determined, and the 12 cm disc cartridge 200 is maintained horizontal, i.e., parallel with respect to the bottom of the tray 20.

Simultaneously, an end of the lever 110 pivoted to the upper cover 100 is pivotally moved downward in accordance with the advancing of the tray 20 into the case 10. Subsequently, the damper 112 is advanced into the accommodating hole 200a of the 12 cm disc cartridge 200 to press the hub of the disc d and to chuck the disc d onto the turn table 92.

In such a situation, it is detected whether the third sensor switch is in "on" state (Step S102), and if yes, it is determined that a disc cartridge or a naked disc is positioned (Step S103), and if not, it is determined that an adapter 65 is positioned (Step S104).

After the step S103, it is detected if the recording/reproducing medium positioned on the tray 20 is the disc cartridge or the naked disc. When the first sensor switch 52a and the leaf switch 64 are in the "off" state, it is determined that the naked disc is positioned (Step S106). If not, it is determined that the disc cartridge is positioned (Step S107).

Here, when the first sensor switch 52a is in the "on" state (Step S108), it is determined that the recording/reproducing medium positioned on the tray 20 is the 12 cm disc cartridge 200 (Step S109). If the leaf switch 64 is in "on" state (Step S110), it is determined that the recording/reproducing medium positioned on the tray 20 is the 8 cm disc cartridge 210 (Step S111).

After detecting the type of recording/reproducing medium, the pickup base 96 having the optical head 98 is moved to an initial position (Step S112). In such a situation, by other sensor switches which are selectively inserted into the first sensor holes 200c of the disc cartridge 200, the state of the disc d is detected. For example, by checking whether one of the sensor switches, that is used as a recording surface sensor switch, is turned "on" or "off" (Step S113), sides A and B of the disc can be detected (Steps S114 and S115). Further, by checking whether one of the sensor switches, that is used as a format sensor switch, is turned "on" or "off" (Step S116), it is detected whether the disc is formatted or not (Steps S117 and S118).

Further, the term "verification" hereinafter means one of information recording processes in which the newly recorded information is re-read, compared, and checked with respect to the preexisting information to confirm that the new information is successfully recorded.

After the state of the disc, i.e., the size, recording surface, formatted status or the like are detected as above, the results are displayed to the user for checking (Step S119). Then, it is detected whether to perform the verification with respect to the recording surface of the disc or not (Steps S120 and S121). Then, it is detected what type of information transfer is to occur, i.e., whether the information is to be recorded or reproduced (Steps S122, S123, and S124). Finally, the information is recorded and/or reproduced on/from the disc in accordance with the detected results (Step S125).

Here, when the presence of an adapter on the tray is detected, the process is performed from the step S112 after the step S104. When a naked disc is detected (Step S106), the optical head 98 is moved to the initial position (Step S106a), and then it is detected whether the naked disc is single-sided or double-sided (Step S106b), and the recording and/or reproducing is performed (Step S106c), accordingly. Here, information as to whether the recording surface of the naked disc is side A or B, is detected by the optical head 98 which reads information about sides A and B of the naked disc which is recorded in a reading area of the disc.

FIGS. 9 to 13 show the situation in which the 8 cm disc cartridge 210 is positioned on the tray 20, and the information is recorded/reproduced on/from the disc d' thereof. The 8 cm disc cartridge 210 is positioned on the tray 20, pushing the press rods 30 formed on the press slider 26 backward. In this situation, the bracket shafts 48 whose respective ends are protruded from the piercing hole 20j of the tray 20 are inserted into the holes 212e of the 8 cm disc cartridge 210. Also, the press rods 30 which have been pushed backward are moved toward the cartridge case 212 of the 8 cm disc cartridge 210 by the restoring force of the first coil spring 34. Accordingly, movement of the 8 cm disc cartridge 210 is prevented.

Then, the holder brackets 40 disposed at the coupling holes 20i of the tray 20 are pressed from both sides of the tray 20. Accordingly, the holder brackets 40 are moved inward with respect to the tray 20 along the guide rails 20h into which the guide pieces 38 are inserted, to press against both sides of the case 212 of the 8 cm disc cartridge 210. Thus, the movement of the 8 cm disc cartridge 210 in a lateral direction is prevented.

Figure 11:
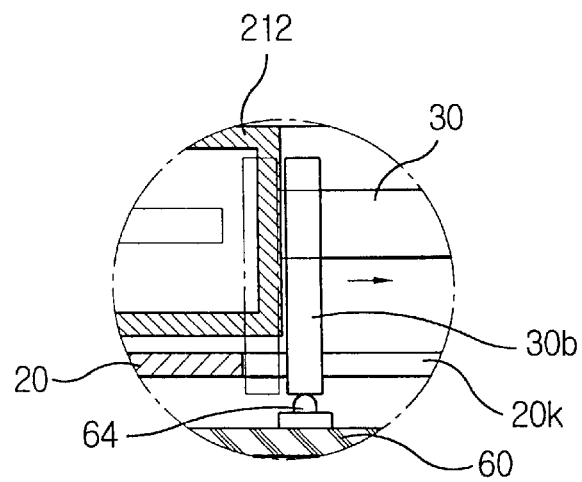
FIG. 11 is an enlarged view of an area B shown in FIG. 10.

In such a situation, when the tray 20 is advanced into the case 10, through the same process described above, the shutter 220 of the 8 cm disc cartridge 210 is moved in a certain direction by the opening protrusion 104 of the link 102. Then the deck base 60 is elevated, whereby the turn table 92 is moved upward and advanced into the accommodating hole 212a of the 8 cm disc cartridge 210 and the disc d' becomes positioned on the turn table. At this time, as shown in FIG. 11, the leaf switch 64 attached to the deck base 60 contacts the contact portions 30b of the press rods 30, and detects that the recording/reproducing medium positioned on the tray 20 is the 8 cm disc cartridge 210.

When the 8 cm disc cartridge 210 is detected by the leaf switch 64, the driving motor 82 is accordingly rotated in accordance with the detected signal. Simultaneously, the worm 88, coupled to the rotary shaft of the driving motor 82, and the worm gear 86, engaged with the worm 88, are rotated together.

Figure 13:
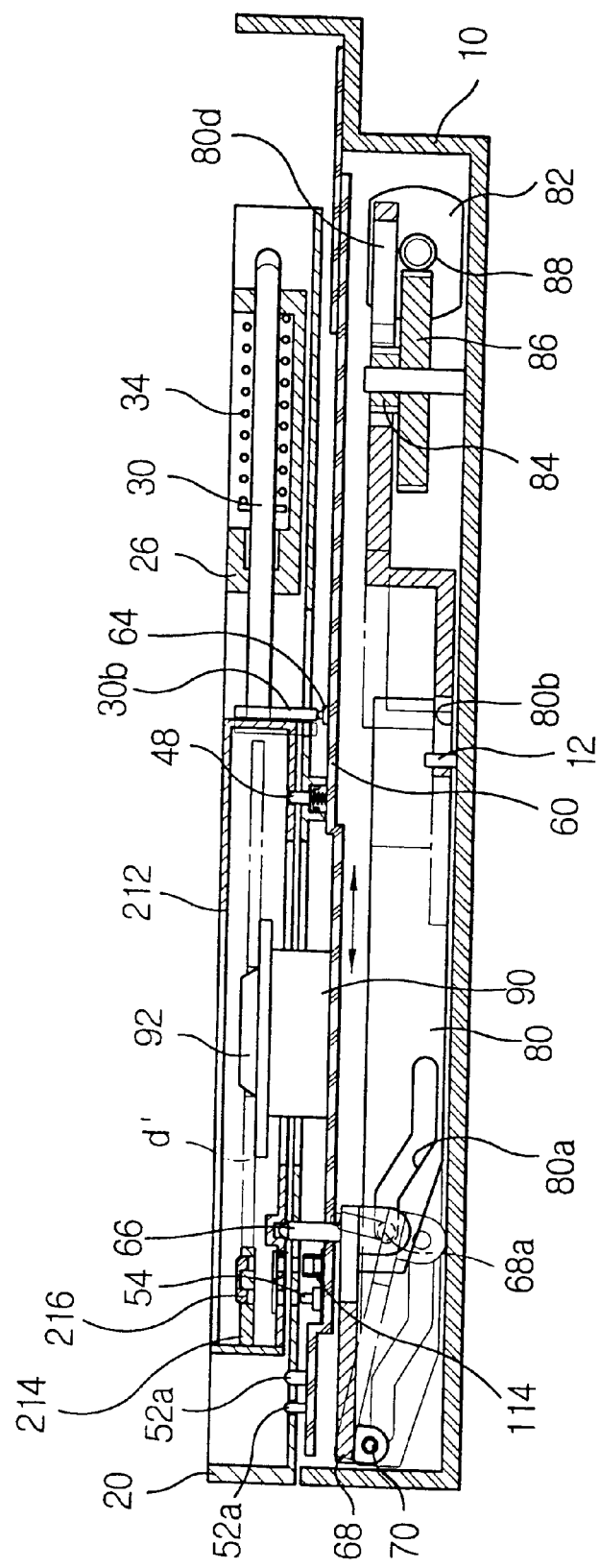
FIG. 13 is a sectional view showing an operation of a slider employed in the optical recording/reproducing apparatus according to the preferred embodiment of the present invention.
Figure 14A:
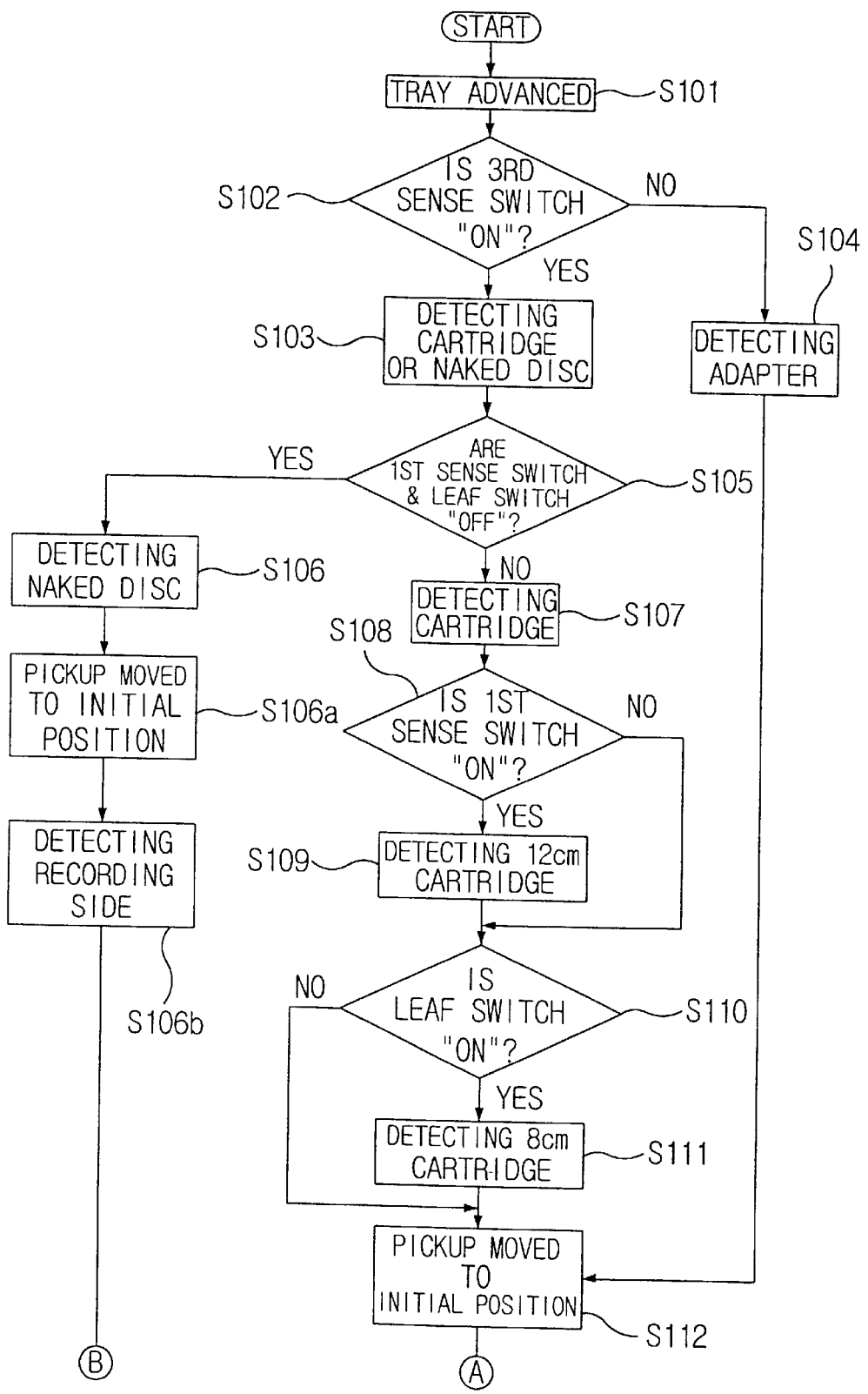
FIGS. 14A and 14B are flow charts for illustrating a method of recording/reproducing information using an optical recording/reproducing apparatus according to the preferred embodiment of the present invention.
Figure 14B:
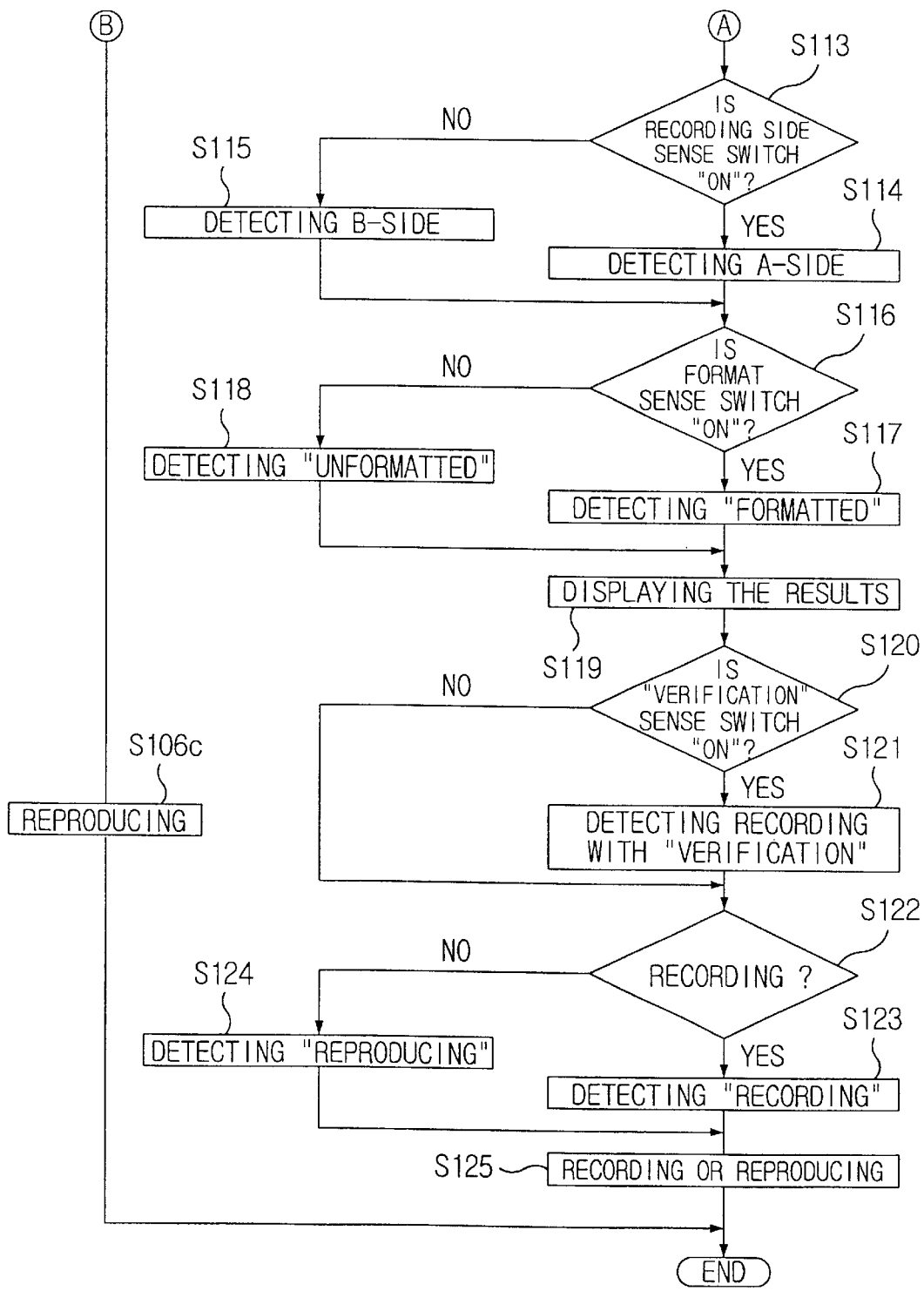

Also, as shown in FIG. 13, as the gear 84 engaged with the rack gear 80c of the slider 80 is rotated, the slider 80 is moved backward. In such a situation, the rotational bracket 68, which is coupled to the inner side of the case 10 by the hinge pin 70, is elevated as the insert protrusions 68a protruding from both sides of the rotational bracket 68 are moved along the slanted slots 80a by the linear movement of the slider 80. Simultaneously, the second positioning pins 66 fixed to the upper surface of the rotational bracket 68 pass through the holes 60a of the deck base 60 and through the second positioning pin holes 20g of the tray 20, and are inserted into the insert holes 212f of the disc cartridge 210. Accordingly, the position of the 8 cm disc cartridge 210 with respect to the tray 20 is determined.

After that, the laser beam is projected from the light emitting element 56a which is attached to the circuit board 58 of the deck base 60. The laser beam passes through the second detecting hole 20e of the tray 20 and the piercing hole 212c of the disc cartridge 210, and to the diffusion lens 216 inserted into the fitting holes 214a of the opening cover 214. The laser beam is then received in the light receiving element 56b through the sensor hole 212d and the second detecting hole 20e. Accordingly, the states of the disc are detected.

As shown in FIG. 12, the laser beam projected from the light emitting element 56a attached to the circuit board 58 is projected to the insert portion 216a of the diffusion lens 216 while passing through the piercing hole 212c of the disc cartridge case 212. The laser beam projected to the insert portions 216a is branched off to a plurality of beams which are respectively transmitted to the connectors 216b, which are linking the insert portions 216a with other ones of the insert portions 216a. Such transmitted laser beams are received in the light receiving element 56b formed at the position corresponding to the second sensor holes 212d and the second detecting holes 20e, after being passed through the second sensor holes 212d and the second detecting holes 20e. Accordingly, it is automatically detected whether the disc accommodated in the disc cartridge is single-sided disc or double-sided, and formatted or unformatted.

More specifically, by manually operating and thus blocking one of the sensor holes on the 8 cm disc cartridge 210 with the light receiving plate 218 which is movably attached to the disc cartridge case 212, the user can prevent the laser beam projected through the diffusion lens 216 from being transmitted to the corresponding light receiving element 56b. In this case, it is detected that the disc d' has not been drawn out from the 8 cm disc cartridge 210 even once. If the light receiving plate 218 is operated to block another sensor hole, it is detected that the disc d' is double-sided, while the disc d' is detected to be a single-sided if the laser is received in the light receiving element 56b. Likewise, by manually operating another sensor hole, it is detected whether the disc d' is formatted or unformatted.

Here, due to the presence of the holder 114 surrounding the light receiving elements 56b, the laser beams are not diffused through the other unintended neighboring light receiving elements 56b. Accordingly, the precise detection of the states of the disc is guaranteed.

If a naked disc is positioned on the tray 20, then the optical recording/reproducing apparatus moves the pickup base 96 having the optical head 98 to the initial position after detecting the naked disc. Then, it is detected whether the naked disc is single-sided disc or double-sided, and the information is recorded and/or reproduced on/from the detected available side(s) of the naked disc.

Meanwhile, there is an A3 sensor hole which is in an open-state. Thus, when the adapter 65 containing the disc d' having diameter of 8 cm is positioned onto the tray 20, the third sensor switch is inserted into the A3 sensor hole, and accordingly, it is detected that the adapter for the 8 cm disc is positioned.

When the adapter is detected through the sensor switch, the pickup base 96 having the optical head 98 is moved to the initial position. Then, after detecting whether the disc d' is single-sided or double-sided, the information is recorded/reproduced on/from the detected available side(s) of the disc d'.

As described above, according to the optical recording/reproducing apparatus of the present invention, the disc cartridges of different sizes, the naked disc, and the adapter containing the 8 cm disc can be positioned on only one tray to be used, so that the compatibility thereof is enhanced, and the cost is reduced.

Further, according to the optical recording/reproducing apparatus of the present invention, since the states of the discs accommodated in the disc cartridges and the adapter positioned on the tray are automatically detected, and since the operation thereof is automatically carried out according to the sensed states of the discs, the time taken to record/reproduce the information on the disc is shortened, thus providing a greater convenience to the user.

While the present invention has been shown and described with reference to the preferred embodiment thereof, it will be understood by those skilled in the art that various changes in form and details may be effected therein without departing from the spirit and scope of the invention as defined by the appended claims.

What is claimed is:

1. An optical recording and/or reproducing apparatus for selectively accommodating at least two differently sized disc cartridges as recording/reproducing mediums, the cartridges containing respective differently sized discs, the apparatus comprising:

a case forming an interior space;

a tray mounted to the case and insertable into and withdrawable from the interior space, the tray accommodating a selected one of the at least two different sizes of disc cartridges;

supporting means for supporting the selected disc cartridge on the tray, so as to prevent movement of the selected disc cartridge relative to the tray;

detecting means for detecting the size of the selected disc cartridge positioned on the tray, and states of the respective disc accommodated therein;

rotating means for rotating the respective disc of the selected disc cartridge positioned on the tray; and information transfer means for recording information on and/or reproducing the information from the disc rotated by the rotating means;

a movable deck base on which the rotating means and the information recording/reproducing means are mounted being positioned in the case;

wherein the rotating means and the information transfer means are movable into an operative position in response to insertion of the tray into the case, and movable to an inoperative position in response to withdrawal of the tray from the case;

the detecting means comprising:

a first detector for detecting whether a first of the different sized disc cartridges is on the tray and a state of the disc accommodated therein, and a second detector for detecting whether a second of the disc cartridges is on the tray and a state of the disc accommodated therein;

wherein the first disc cartridge has a plurality of sensor holes;

the first detector comprising:

a plurality of first detecting holes formed on the tray corresponding to the sensor holes of the first disc cartridge; and a plurality of sensor switches attached to the deck base, to be inserted into the sensor holes of the first disc cartridge through the first detecting holes;

the sensor holes of the first disc cartridge comprising a cartridge detecting sensor hole, and a plurality of disc state detecting sensor holes, the sensor switches comprise a first sensor switch arranged to correspond to the cartridge detecting sensor hole, and a plurality of second sensor switches arranged to correspond to the disc state detecting sensor holes.

2. The apparatus as claimed in claim 1, wherein: each of the differently sized cartridges comprises:

an accommodating hole, an opening, a slidable shutter arranged to open/close the accommodating hole and the opening; and the optical recording and/or reproducing apparatus further comprising means for opening/closing the shutter in accordance with the insertion/withdrawal, respectively, of the tray with respect to the case.

3. The apparatus as claimed in claim 2, further comprising:

an upper cover coupled to an upper portion of the case and having a lower surface; wherein the shutter opening/closing means comprises:

a link pivotally disposed at the lower surface of the upper cover, and having first and second ends, an opening protrusion protruding from the first end of the link to contact respective sides of the shutters of the disc cartridges upon reception of the tray within the case, and a spring disposed at the second end of the link, to return the link to an initial position, wherein the link is pivoted in accordance with reception/withdrawal of the tray with respect to the case.

4. The apparatus as claimed in claim 1, wherein the first disc cartridge holds a 12 cm diameter disc, and the second disc cartridge holds an 8 cm diameter disc, the supporting means comprising:

a press member arranged to contact and press against a side of the respective first disc cartridge and the second disc cartridge;

a holding mechanism arranged to hold both sides of the second disc cartridge, to prevent movement of the second disc cartridge relative to the tray; and a horizontalness mechanism arranged to maintain a horizontalness of the second disc cartridge with respect to a bottom of the tray.

5. The apparatus as claimed in claim 4, wherein: the tray comprises a pair of guide grooves; and the press member comprises:
- a press slider disposed on the tray, the press slider having a pair of hooks arranged to be inserted into the pair of guide grooves of the tray, the press slider further having a pair of holes,
- a pair of press portions integrally formed at first and second sides of the press slider, to press against the side of the first disc cartridge,
- a pair of press rods movably disposed within the respective holes of the press slider, and linearly movable to press against a side of the second disc cartridge positioned on the tray, and
- a pair of first coil springs disposed around the pair of press rods to elastically bias the press rods toward initial positions, respectively.

6. The apparatus as claimed in claim 5, wherein the second disc cartridge has a plurality of sensor holes; the second detector comprises:
- at least one leaf switch attached to the deck base and exposed through the guide grooves of the tray, the leaf switch arranged for detecting whether the second disc cartridge is positioned on the tray by selectively contacting the contact portions of the press rods which are moved along the guide grooves, and in response, turned on/off,
- a plurality of second detecting holes formed on the tray corresponding to the sensor holes of the second disc cartridge, and
- a photo-sensor attached to the deck base, to detect the state of the disc accommodated in the second disc cartridge by projecting a laser beam through the second detecting holes to the sensor holes of the second disc cartridge, and to receive the laser beam projected through the second detecting holes to the sensor hole of the second disc cartridge, and,
- the disc cartridge positioned on the tray is detected as being the second disc cartridge when the leaf switch is in 'on' state.

7. The apparatus as claimed in claim 6, wherein:
the second disc cartridge has a body and an opening cover, the opening cover having a diffusion lens disposed at the opening cover at position corresponding to the sensor holes of the second cartridge;
the photo-sensor comprises:
- a light emitting element to project the laser beam to the diffusion lens through one of the second detecting holes of the tray,
- a plurality of light receiving elements disposed at positions corresponding to the sensor holes of the second disc cartridge, the light receiving elements arranged to receive the laser beams transmitted to the sensor holes of the second disc cartridge via the diffusion lens, and
- a circuit board to which the light emitting element and the light receiving elements are attached and supported, the circuit board arranged to electrically detect received laser beams received by the light receiving elements.

8. The apparatus as claimed in claim 7, wherein the light receiving plate is disposed at the respective sensor holes of the second disc cartridge to selectively open/close the sensor holes, to control the detecting of the state of the disc accommodated in the second disc cartridge according to movement thereof by a user.

9. The apparatus as claimed in claim 7, wherein each of the light receiving elements is surrounded by a respective holder having a predetermined height, so that the laser beams are not diffused through other neighboring ones of the light receiving elements.

10. An optical recording and/or reproducing apparatus for accommodating a recording/reproducing medium, the recording/reproducing medium selectively comprising at least two differently sized disc cartridges which receive respective differently sized discs, an adapter which accommodates a disc having a diameter of 8 cm, and a naked disc; the optical recording and/or reproducing apparatus comprising:
- a case forming an interior space;
- a tray mounted to the case and insertable into and withdrawable from the interior space, the tray accommodating a selected one of: first and second disc cartridges, the adapter, and the naked disc as the selected recording/reproducing medium;
- supporting means for supporting the selected recording/reproducing medium on the tray, so as to prevent movement of the selected recording/reproducing medium relative to the tray;
- first positioning means for determining a first position of the first disc cartridge on the tray;
- first detecting means for detecting a size of the first disc cartridge positioned on the tray by the first positioning means, and a state of a disc accommodated in the first disc cartridge;
- second positioning means for determining a second position of the second disc cartridge on the tray;
- second detecting means for detecting a size of the second disc cartridge positioned on the tray by the second positioning means, and a state of the disc accommodated in the second disc cartridge;
- third detecting means for detecting the adapter positioned on the tray, and a state of the disc accommodated in the adapter;
- disc rotating means for rotating the disc of the selected recording/reproducing medium positioned on the tray;
- information recording/reproducing means for recording information on and/or reproducing information from the disc rotated by the disc rotating means; and
- a movable deck base on which the rotating means and the information recording/reproducing means are mounted, the deck base positioned in the case;
- wherein the rotating means and the information recording/reproducing means are movable into an operative position in response to insertion of the tray into the case, and movable to an inoperative position in response to withdrawal of the tray from the case.

11. The apparatus as claimed in claim 10, wherein the first disc cartridge has insert apertures formed therein,
the first positioning means comprises:
- a pair of first positioning pin holes formed on the tray corresponding to the insert apertures of the first disc cartridge; and
- a pair of first positioning pins disposed on the deck base arranged to be inserted into the insert apertures of the first disc cartridge after being passed through the first positioning pin holes.

12. The apparatus as claimed in claim 10, wherein the second disc cartridge has insert apertures formed thereon,
the second positioning means comprises:

a pair of second positioning pin holes formed on the tray corresponding to the insert apertures of the second disc cartridge;

a rotational bracket movably disposed on the case by a hinge pin and arranged to be moved upwardly and downwardly, and having a pair of second positioning pins arranged to be inserted into the insert apertures of the second disc cartridge after being passed through the second positioning pin holes; and rotational bracket operating means operated by the second detecting means to rotate the rotational bracket upwardly and downwardly.

13. The apparatus as claimed in claim 12, wherein:

the case comprises a pair of guide protrusions protruding from a bottom of the case, the rotational bracket comprises a pair of insert protrusions protruding from both sides of the rotational bracket, the rotational bracket operating means comprises:

a slider arranged to be reciprocally and linearly moved along a pair of guide protrusions of the case, and having a pair of slanted slots formed on both sides thereof through which the insert protrusions of the rotational brackets are inserted, coupling holes formed on a rear end of the slider, which have rack gears formed at an inner circumference of the coupling holes;

a motor for reciprocally and linearly moving the slider by being turned 'on/off' by the second detecting means; and a power transmitter for transmitting the driving force of the motor to the slider.

14. The apparatus as claimed in claim 13, wherein the driving force transmitter comprises:

a gear engaged with the rack gear of the slider by being inserted into the coupling holes of the slider;

worm gear coaxially connected with the gear; and worm press-fitted to a shaft of the motor to be engaged with the worm gear.

15. An optical recording and/or reproducing apparatus for selectively accommodating an adapter and at least two differently sized disc cartridges as recording/reproducing mediums, the cartridges accommodating respective differently sized discs and the adapter accommodating a disc having a diameter of 8 cm, each of the recording/reproducing mediums having an accommodating hole, an opening, and a shutter slidably disposed thereon to open/close the accommodating hole and the opening, the optical recording and/or reproducing apparatus comprising:

a case forming an interior space;

a tray mounted to the case and insertable into and withdrawable from the interior space, the tray accommodating a selected one of: first and second disc cartridges, the adapter, and the naked disc as the selected recording/reproducing medium;

supporting means for supporting the selected recording/reproducing medium on the tray, so as to prevent movement of the selected recording/reproducing medium relative to the tray;

first positioning means for determining a first position of the first disc cartridge on the tray;

first detecting means for detecting a size of the first disc cartridge positioned on the tray by the first positioning means, and a state of a disc accommodated in the first disc cartridge;

second positioning means for determining a second position of the second disc cartridge on the tray;

second detecting means for detecting a size of the second disc cartridge positioned on the tray by the second positioning means, and a state of the disc accommodated in the second disc cartridge;

third detecting means for detecting the adapter positioned on the tray, and a state of the disc accommodated in the adapter;

disc rotating means for rotating the disc of the selected recording/reproducing medium positioned on the tray;

information recording/reproducing means for recording information on and/or reproducing the information from the disc rotated by the disc rotating means;

shutter opening/closing means for opening/closing the shutters in accordance with the reception/withdrawal of the tray with respect to the case;

disc chucking means for pressing a hub of the disc accommodated in the selected recording/reproducing mediums, to chuck the disc onto the disc rotating means; and a movable deck base on which the disc rotating means and the information recording/reproducing means are mounted, the deck base positioned in the case;

wherein the disc rotating means and the information recording/reproducing means are movable into an operative position in response to insertion of the tray into the case, and movable to an inoperative position in response to withdrawal of the tray from the case.

16. A method of recording and/or reproducing information using an optical recording and/or reproducing apparatus, comprising the steps of:

a) detecting whether a recording/reproducing medium is positioned in a tray of the optical recording and/or reproducing apparatus;

b) moving a recording and/or reproducing device of the optical recording and/or reproducing apparatus to an initial position when the recording/reproducing medium is detected as positioned in the step a);

c) detecting a type and size of the recording/reproducing medium positioned on the tray;

d) detecting whether the disc accommodated in the recording/reproducing medium is single, or double-sided;

e) detecting whether the disc is formatted or unformatted;

f) displaying information about the type, size, and recordable side of the disc, and whether the disc is formatted or not, which are detected in the steps c), d), and e), to a user;

g) detecting whether to verify a recordable side of the disc or not;

h) detecting whether to record or reproduce the information on/from the disc; and i) recording and/or reproducing the information on/from the disc in accordance with the results detected in the above steps.

17. An optical recording and/or reproducing apparatus for selectively accommodating an adapter and at least two differently sized disc cartridges as recording/reproducing mediums, the cartridges containing respective differently sized discs, and the adapter accommodating a disc having a diameter of 8 cm, the apparatus comprising:

a case forming an interior space;

a tray mounted to the case and insertable into and withdrawable from the interior space, the tray accommodating a selected one of: the two differently sized disc cartridges and the adapter as the selected recording/reproducing medium;

support means for supporting the selected recording/reproducing medium on the tray, so as to prevent movement of the selected recording/reproducing medium relative to the tray;

detecting means for detecting whether a recording/reproducing medium positioned on the tray is a first disc cartridge accommodating a disc having a diameter of 12 cm, a second disc cartridge accommodating a disc having a diameter of 8 cm, or the adapter, and for detecting a state of the disc accommodated in the selected recording/reproducing medium;

rotating means for rotating the disc of the selected recording/reproducing medium positioned on the tray;

information encoding/reproducing means for recording information on and/or reproducing the information from the disc rotated by the rotating means; and a movable deck base on which the rotating means and the information recording/reproducing means are mounted, the deck base positioned in the case;

wherein the rotating means and the information recording/reproducing means are movable into an operative position in response to insertion of the tray into the case, and movable to an inoperative position in response to withdrawal of the tray from the case;

the second disc cartridge having a pair of position holes formed at a lower surface thereof;

the tray further comprising a pair of piercing holes, alignable with respective ones of the position holes; and wherein the supporting means comprises a horizontalness mechanism arranged to maintain a horizontalness of the second disc cartridge with respect to a bottom of the tray and including a pair of bracket shafts movably disposed for upward movement to selectively protrude through corresponding ones of the piercing holes so that the bracket shafts are inserted in respective ones of the position holes formed at a lower surface of the second disc cartridge.

18. An optical recording and/or reproducing apparatus for selectively accommodating an adapter and at least two differently sized disc cartridges as recording/reproducing mediums, the cartridges containing respective differently sized discs, and the adapter accommodating a disc having a diameter of 8 cm, the apparatus comprising:

a case forming an interior space;

a tray mounted to the case and insertable into and withdrawable from the interior space, the tray accommodating a selected one of: the two differently sized disc cartridges and the adapter as the selected recording/reproducing medium;

supporting means for supporting the selected recording/reproducing medium on the tray, so as to prevent movement of the selected recording/reproducing medium relative to the tray;

detecting means for detecting whether a recording/reproducing medium positioned on the tray is a first disc cartridge accommodating a disc having a diameter of 12 cm, a second disc cartridge accommodating a disc having a diameter of 8 cm, or the adapter, and for detecting a state of the disc accommodated in the selected recording/reproducing medium;

rotating means for rotating the disc of the selected recording/reproducing medium positioned on the tray;

information recording/reproducing means for recording information on and/or reproducing the information from the disc rotated by the rotating means; and a movable deck base on which the rotating means and the information recording/reproducing means are mounted, the deck base positioned in the case;

wherein the rotating means and the information recording/reproducing means are movable into an operative position in response to insertion of the tray into the case, and movable to an inoperative position in response to withdrawal of the tray from the case;

wherein the detecting means comprises:

a first detector for detecting whether the first disc cartridge is on the tray and a state of the disc accommodated therein;

a second detector for detecting whether the second disc cartridge is on the tray and the state of a disc accommodated therein; and a third detector for detecting whether the adapter is positioned on the tray, and the state of a disc accommodated therein.

19. The apparatus as claimed in claim 18, wherein, the first disc cartridge has a plurality of sensor holes; and the first detector comprises:

a plurality of first detecting holes formed on the tray corresponding to the sensor holes of the first disc cartridge; and at least one sensor switch attached to the deck base, to be inserted into the sensor holes of the first disc cartridge through the first detecting holes, wherein, the sensor holes of the first disc cartridge comprise a cartridge detecting sensor hole, and a plurality of disc state detecting sensor holes, and the sensor switches comprise a first sensor switch arranged to correspond to the cartridge detecting sensor hole, and a plurality of second sensor switches arranged to correspond to the disc state detecting sensor holes, and the recording/reproducing medium positioned on the tray is detected as being the first disc cartridge when the first sensor switch is turned 'on'.

20. The apparatus as claimed in claim 18, wherein the second disc cartridge has a plurality of sensor holes; the second detecting means comprises:

at least one leaf switch attached to the deck base and exposed through the guide grooves of the tray, the leaf switch arranged for detecting whether the second disc cartridge is positioned on the tray by selectively contacting the contact portions of the press rods which are moved along the guide grooves, and in response, turned on/off, a plurality of second detecting holes formed on the tray corresponding to the sensor holes of the second disc cartridge, and a photo-sensor attached to the deck base, to detect the state of the disc accommodated in the second disc cartridge by protecting a laser beam through the second detecting holes to the sensor holes of the second disc cartridge, and to receive the laser beam projected through the second detecting holes to the sensor hole of the second disc cartridge, and, the recording/reproducing medium positioned on the tray is detected as being the second disc cartridge when the leaf switch is in 'on' state.

21. The apparatus as claimed in claim 19, wherein, the adapter has an adapter sensor hole; the third detector comprises a third sensor switch disposed on the deck base corresponding to the adapter sensor hole formed on the adapter, and the recording/reproducing medium positioned on the tray is detected as being the adapter when the third sensor switch is in 'off' state.

22. A method of recording and/or reproducing information using an optical recording and/or reproducing apparatus, comprising the steps of:

a) detecting whether a recording/reproducing medium is positioned on a tray of the optical recording and/reproducing apparatus;

b) detecting the recording/reproducing medium positioned on the tray as being the first disc cartridge when a first sensor switch of the optical recording and/or reproducing apparatus is in 'on' state, or as being the second disc cartridge when a leaf switch is in 'on' state, or as being the adapter when a third sensor switch is in 'off' state, or as being the naked disc when the first sensor switch, the leaf switch, and the third sensor switch are in 'off' state;

c) detecting a state of a disc accommodated in the recording/reproducing medium; and d) recording and/or reproducing information on the disc in accordance with the results detected in step c).

23. The method as claimed in claim 22, wherein the step c) comprises the sub-steps of:

c1) detecting whether the disc is single-sided or double-sided;

c2) detecting whether the disc is formatted or unformatted;

c3) detecting whether to verify a recordable side of the disc or not; and c4) detecting whether to record or reproduce the information on/from the disc.

24. A method of recording and/or reproducing information using an optical recording and/or reproducing apparatus, comprising the steps of:

a) detecting whether a recording/reproducing medium is positioned on a tray of the optical recording and/reproducing apparatus;

b) detecting the recording/reproducing medium positioned on the tray as being the first disc cartridge, a second smaller disc cartridge, an adapter, or a naked disc;

c) detecting a state of a disc accommodated in the recording/reproducing medium by;

c1) detecting whether the disc is single-sided or double-sided;

c2) detecting whether the disc is formatted or unformatted;

c3) detecting whether to verify a recordable side of the disc or not; and c4) detecting whether to record or reproduce the information on/from the disc; and d) recording and/or reproducing information on the disc in accordance with the results detected in step c).

* * * * *